United States Patent
Hannan et al.

(10) Patent No.: US 12,114,299 B2
(45) Date of Patent: Oct. 8, 2024

(54) SYSTEMS AND METHODS FOR PLANNING AND OPERATING RADIOS CONTROLLED BY A SPECTRUM ACCESS SYSTEM

(71) Applicant: Outdoor Wireless Networks LLC, Claremont, NC (US)

(72) Inventors: Ariful Hannan, Sterling, VA (US); Ahmed H. Hmimy, Richardson, TX (US); Tyler J Hanson, Plymouth, MN (US)

(73) Assignee: Outdoor Wireless Networks LLC, Claremont, NC (US)

( * ) Notice: Subject to any disclaimer, the term of this patent is extended or adjusted under 35 U.S.C. 154(b) by 428 days.

(21) Appl. No.: 17/626,403

(22) PCT Filed: Nov. 5, 2021

(86) PCT No.: PCT/US2021/058264
§ 371 (c)(1),
(2) Date: Jan. 11, 2022

(87) PCT Pub. No.: WO2022/099015
PCT Pub. Date: May 12, 2022

(65) Prior Publication Data
US 2022/0272701 A1  Aug. 25, 2022

Related U.S. Application Data

(60) Provisional application No. 63/111,418, filed on Nov. 9, 2020.

(51) Int. Cl.
*H04W 72/0453* (2023.01)
*H04B 7/024* (2017.01)
*H04W 52/34* (2009.01)

(52) U.S. Cl.
CPC ........ *H04W 72/0453* (2013.01); *H04B 7/024* (2013.01); *H04W 52/34* (2013.01)

(58) Field of Classification Search
CPC . H04W 72/0453; H04W 52/34; H04W 16/02; H04W 16/14; H04B 7/024
(Continued)

(56) References Cited

U.S. PATENT DOCUMENTS 10,098,005 B2   10/2018  MacMullan et al.
10,681,560 B1 *  6/2020  Sevindik ............... H04W 16/14
(Continued)

FOREIGN PATENT DOCUMENTS

TW    202046760 A    12/2020
WO    2018119153 A3   3/2019
WO    2020209941 A1  10/2020

OTHER PUBLICATIONS

CBRS Alliance Release 1 Specifications, "CBRS Coexistence Technical Specification, I.D. No. CBRSA-TS-2001", V2.0.0, Mar. 11, 2019, pp. 1 through 23, (c) 2019 CBRS Alliance.
(Continued)

*Primary Examiner* — Obaidul Huq
(74) *Attorney, Agent, or Firm* — Fogg & Powers LLC

(57) ABSTRACT

Techniques are provided for planning frequency spectrum and power allocated to transmission points of a radio network that is controlled by a spectrum access system and shares spectrum with incumbents and/or other secondary users (e.g., external radio(s)). Techniques are also provided for managing communications between components of the radio network and the spectrum access system, and to allocate frequency spectrum and maximum transmission power to component(s) of a radio network.

30 Claims, 9 Drawing Sheets

(58) Field of Classification Search
USPC .................................... 370/310, 328, 329
See application file for complete search history.

(56) References Cited

U.S. PATENT DOCUMENTS

| | | | |
|---|---|---|---|
| 2015/0079974 | A1 | 3/2015 | Farhadi et al. |
| 2016/0295572 | A1* | 10/2016 | Hahn ............... H04W 28/0278 |
| 2017/0013465 | A1 | 1/2017 | Luo et al. |
| 2017/0238136 | A1 | 8/2017 | Smith |
| 2018/0184430 | A1* | 6/2018 | Das .......................... H04L 43/20 |
| 2018/0376341 | A1 | 12/2018 | Khoshnevisan et al. |
| 2019/0069187 | A1 | 2/2019 | Ashrafi |
| 2020/0236685 | A1 | 7/2020 | Mueck et al. |

OTHER PUBLICATIONS

Eisenblatter, Andreas, et al., "Frequency Planning and Ramification of Coloring", Discussiones Mathematicae, Graph Theory 22, (2002), pp. 51 through 88.

Federal Register, "Shared Commercial Operations in the 3550-3650 MHZ Band", Federal Communications Commission, Final Rule, vol. 80, No. 120, Jun. 23, 2015, Rules and Regulations, pp. 36163 through 36230, Published: US.

Grotschel, Martin et al., "Graph Colouring and Frequency Assignment", DFG Research Center MATHEON, Mathematics for key technologies, at least as early as Jan. 3, 2019, pp. 1 through 61, Published: Berlin, DE.

Hsuan, Yi, et al., "Inter Coexistence Group GAA Resource Allocation", Wireless Innovation Forum Contribution, Doc. No. WINNF-18-1-00007, Jan. 10, 2018, pp. 1 through 12, (c) 2015 Software Defined Radio Forum.

International Searching Authority, "International Search Report and Written Opinion from PCT Application No. PCT/US2020/019410, dated Jun. 16, 2020", from Foreign Counterpart to U.S. Appl. No. 17/601,300, pp. 1-10, Published in: KR.

Khoshnevisan, Mostafa, et al., "Text Proposal for Inter-CSG Coexistence", CBRS Alliance, Technical Working Group: Coexistence Task Group, V.2, Target Document Version: C-TG-16-011_Rev [xx], Dec. 1, 2016, pp. 1 through 10.

Khoshnevisan, Mostafa, et al., "Text Proposal for Inter-CSG Coexistence", CBRS Alliance, Technical Working Group: Coexistence Task Group, V.2, Target Document Version: C-TG-16-011_Rev [xx], Nov. 14, 2016, pp. 1 through 8.

Moore et al., "Greedy Algorithms", Brilliant Math and Science Wiki, https://brilliant.or/siki/greedy-algorithm, as downloaded Feb. 27, 2019, pp. 1 through 5.

Wireless Innovation Forum Contribution, "WINNF-TR-2003, Operations for Citizens Broadband Radio Service (CBRS); GAA Spectrum Coordination-Approach 1 Technical Report", V0.0.0-R2.0, Jan. 17, 2019, pp. Title Page through 24, (c) 2019 The Software Defined Radio Forum Inc.

Wireless Innovation Forum, WINNF-TS-0112, Requirements for Commercial Opeation in the U.S. 3550-3700 MHZ Citizens Broadband Radio Service Band, V1.9.1, Mar. 11, 2020, pp. Title page through 76.

Wireless Innovation Forum, "WINNF-TS-0112, Requirements for Commercial Operation in the U.S. 3550-3700 MHZ Citizens Broadband Radio Service Band" V1.4.1, Jan. 16, 2018, pp. Title Page through 69.

Aho et al., "Field Trial of Citizens Broadband Radio Service (CBRS) / Spectrum Access System (SAS)", ResearchGate, pp. 1 through 2, Nov. 7, 2016, retrieved on Feb. 3, 2022 from https://www.researchgate.net/publication/309736050.

International Searching Authority, "International Search Report and Written Opinion from PCT Application No. PCT/US2021/058264 dated Feb. 23, 2022", from Foreign Counterpart to U.S. Appl. No. 17/626,403, pp. 1-12, Published in: KR.

Palola et al., Field Trial of The 3.5 GHZ Citizens Broadband Radio Service Governed by a Spectrum Access System (SAS), 2017 IEEE International Symposium on Dynamic Spectrum Access Networks (DySPAN), pp. 1 through 9, Mar. 6, 2017, retrieved on Feb. 3, 2022 from https://ieeexplore.ieee,org/abstract/document/7920760.

\* cited by examiner

SYSTEMS AND METHODS FOR PLANNING AND OPERATING RADIOS CONTROLLED BY A SPECTRUM ACCESS SYSTEM

CROSS-REFERENCE TO RELATED APPLICATIONS

This patent application claims priority to International Patent Application No. PCT/US2021/058264 filed on Nov. 5, 2021, which claims the benefit of U.S. Patent Application Ser. No. 63/111,418, filed Nov. 9, 2020; the entire contents of the aforementioned patent applications are incorporated herein by reference as if set forth in its entirety.

BACKGROUND

A citizens broadband radio service (CBRS) includes incumbents of shared spectrum and secondary users of shared spectrum. An incumbent may also be referred to as a primary user. Incumbents have priority access to transmit in the spectrum shared with the secondary users. If a secondary user seeks permission to transmit on spectrum shared by incumbent(s) and/or other secondary user(s), it will only be permitted to do so to the extent its transmissions do not raise aggregate interference at the incumbent(s) and/or other secondary user(s) above corresponding interference threshold levels for each of such incumbent(s) and secondary user(s).

Such secondary users use citizen broadband radio service device(s) (CBSD(s)). A CBSD is a radio including a transmitter coupled to an antenna, e.g., an access point or base station. A CBRS system includes a spectrum access system (SAS) which regulates the transmissions of CBSD(s) in shared spectrum under the SAS's control, e.g., whether each CBSD of a SAS can transmit in the shared spectrum, and if so then at what power level. The requesting secondary user is a user requesting to transmit in shared spectrum controlled by a SAS and shared with higher priority user(s) and/or other secondary user(s) whose transmission(s) are controlled by the SAS. The SAS must authorize the requesting user to transmit in the spectrum shared with higher priority user(s) and/or the other secondary user(s) controlled by the SAS.

A distributed antenna system (DAS) means a network of spatially separated antennas connected to common signal source(s) through transport media to provide wireless service within a geographic region, such as a building. Complexities of DAS planning and operation are increased when the DAS is part of a CBRS and uses shared spectrum.

SUMMARY OF THE INVENTION

A program product comprises a non-transitory processor readable medium on which program instructions are embodied, wherein the program instructions are configured, when executed by at least one programmable processor, to cause the at least one programmable processor to: receive initial data about each transmission point, of a radio network (RN), whose transmissions in frequency spectrum shared with at least one incumbent are controlled by a spectrum access system (SAS), wherein the initial data comprises a frequency spectrum bandwidth and a transmit power level for each transmission point, wherein each transmission point has an antenna pattern encompassing all or part of a venue, wherein the RN comprises at least one network radio, wherein each network radio is communicatively coupled to at least one transmission point, and wherein the RN is configured to communicate, through a transmission point communicatively coupled to a network radio, with user equipment in the venue; receive data about at least one of: (a) the at least one incumbent, which has priority to receive in the shared frequency spectrum over the at least one transmission point, and (b) at least one region to be maintained free of interference in the shared frequency spectrum; receive data about at least one external radio whose transmissions are in the shared frequency spectrum shared and is controlled by the SAS, wherein each external radio is located external to the venue; generate at least one transmission point neighborhood, wherein each transmission point neighborhood is generated around a geographic location of a unique transmission point or a geographic center of the venue; using at least a portion of the data about at least one of: (a) the at least one incumbent and (b) the at least one region, identify each protection point, representing an incumbent or a region, in each transmission point neighborhood; generate a protection point neighborhood around a geographic location of each protection point identified in a transmission point neighborhood; identify each transmission point in each protection point neighborhood; create an interference coexistence group comprising all transmission points; create a unique channel coexistence group for each set of at least one transmission point connected to a unique network radio of the RN; determine a maximum transmit power level and a frequency spectrum of each transmission point of the RN when an aggregate interference, in the shared frequency spectrum, at each identified protection point does not exceed an interference threshold level of a corresponding protection point, wherein the aggregate interference is from each transmission point identified in a protection point neighborhood around the corresponding protection point; determine, for each transmission point of the RN, if a bandwidth of the determined frequency spectrum is greater than or equal to a frequency spectrum bandwidth of a corresponding transmission point in the initial data and if the determined maximum transmit power level is greater than or equal to respectively a maximum transmit power level of the corresponding transmission point in the initial data; upon determining that both conditions are not met for each transmission point, then identify each transmission point for which both conditions are not met; and receive new transmission point data for each transmission point for which the both conditions are not met or create at least one new interference coexistence group each of which comprises at least one transmission point of the RN, wherein each transmission point that is a member of an interference coexistence group comprising at least two transmission points that can share same frequency spectrum for transmission.

A method comprises: receiving initial data about each transmission point, of a radio network (RN), whose transmissions in frequency spectrum shared with at least one incumbent are controlled by a spectrum access system (SAS), wherein the initial data comprises a frequency spectrum bandwidth and a transmit power level for each transmission point, wherein each transmission point has an antenna pattern encompassing all or part of a venue, wherein the RN comprises at least one network radio, wherein each network radio is communicatively coupled to at least one transmission point, and wherein the RN is configured to communicate, through a transmission point communicatively coupled to a network radio, with user equipment in the venue; receiving data about at least one of: (a) the at least one incumbent, which has priority to receive in the shared frequency spectrum over the at least one transmission point, and (b) at least one region to be maintained free of interference in the shared frequency spectrum; receiving data about at least one external radio whose transmissions are in the shared frequency spectrum shared and is controlled by the SAS, wherein each external radio is located external to the venue; generating at least one transmission point neighborhood, wherein each transmission point neighborhood is generated around a geographic location of a unique transmission point or a geographic center of the venue; using at least a portion of the data about at least one of: (a) the at least one incumbent and (b) the at least one region, identifying each protection point, representing an incumbent or a region, in each transmission point neighborhood; generating a protection point neighborhood around a geographic location of each protection point identified in a transmission point neighborhood; identifying each transmission point in each protection point neighborhood; creating an interference coexistence group comprising all transmission points; creating a unique channel coexistence group for each set of at least one transmission point connected to a unique network radio of the RN; determining a maximum transmit power level and a frequency spectrum of each transmission point of the RN when an aggregate interference, in the shared frequency spectrum, at each identified protection point does not exceed an interference threshold level of a corresponding protection point, wherein the aggregate interference is from each transmission point identified in a protection point neighborhood around the corresponding protection point; determining, for each transmission point of the RN, if a bandwidth of the determined frequency spectrum is greater than or equal to a frequency spectrum bandwidth of a corresponding transmission point in the initial data and if the determined maximum transmit power level is greater than or equal to respectively a maximum transmit power level of the corresponding transmission point in the initial data; upon determining that both conditions are not met for each transmission point, then identifying each transmission point for which both conditions are not met; and receiving new transmission point data for each transmission point for which the both conditions are not met or create at least one new interference coexistence group each of which comprises at least one transmission point of the RN, wherein each transmission point that is a member of an interference coexistence group comprising at least two transmission points that can share same frequency spectrum for transmission.

An apparatus comprises processing circuitry configured to: receive initial data about each transmission point, of a radio network (RN), whose transmissions in frequency spectrum shared with at least one incumbent are controlled by a spectrum access system (SAS), wherein the initial data comprises a frequency spectrum bandwidth and a transmit power level for each transmission point, wherein each transmission point has an antenna pattern encompassing all or part of a venue, wherein the RN comprises at least one network radio, wherein each network radio is communicatively coupled to at least one transmission point, and wherein the RN is configured to communicate, through a transmission point communicatively coupled to a network radio, with user equipment in the venue; receive data about at least one of: (a) the at least one incumbent, which has priority to receive in the shared frequency spectrum over the at least one transmission point, and (b) at least one region to be maintained free of interference in the shared frequency spectrum; receive data about at least one external radio whose transmissions are in the shared frequency spectrum shared and is controlled by the SAS, wherein each external radio is located external to the venue; generate at least one transmission point neighborhood, wherein each transmission point neighborhood is generated around a geographic location of a unique transmission point or a geographic center of the venue; using at least a portion of the data about at least one of: (a) the at least one incumbent and (b) the at least one region, identify each protection point, representing an incumbent or a region, in each transmission point neighborhood; generate a protection point neighborhood around a geographic location of each protection point identified in a transmission point neighborhood; identify each transmission point in each protection point neighborhood; create an interference coexistence group comprising all transmission points; create a unique channel coexistence group for each set of at least one transmission point connected to a unique network radio of the RN; determine a maximum transmit power level and a frequency spectrum of each transmission point of the RN when an aggregate interference, in the shared frequency spectrum, at each identified protection point does not exceed an interference threshold level of a corresponding protection point, wherein the aggregate interference is from each transmission point identified in a protection point neighborhood around the corresponding protection point; determine, for each transmission point of the RN, if a bandwidth of the determined frequency spectrum is greater than or equal to a frequency spectrum bandwidth of a corresponding transmission point in the initial data and if the determined maximum transmit power level is greater than or equal to respectively a maximum transmit power level of the corresponding transmission point in the initial data; upon determining that both conditions are not met for each transmission point, then identify each transmission point for which both conditions are not met; and receive new transmission point data for each transmission point for which the both conditions are not met or create at least one new interference coexistence group each of which comprises at least one transmission point of the RN, wherein each transmission point that is a member of an interference coexistence group comprising at least two transmission points that can share same frequency spectrum for transmission.

A program product comprises a non-transitory processor readable medium on which program instructions are embodied, wherein the program instructions are configured, when executed by at least one programmable processor, to cause the at least one programmable processor to: for each transmission point of each spectrum allocation group (SAG) of a radio network (RN), receive at least one of: one or more available frequency spectrum and a maximum transmit power level for each of the one or more available frequency spectrum, wherein aggregate available frequency spectrum is a sum of the one or more available frequency spectrum received for a transmission point, wherein a SAG comprises one or more baseband units communicatively connected through one output of each the one or more baseband units to one or more network radios, one or more transmission points each of which is electrically connected to one of the one or more network radios, and the one or more network radios, and wherein the radio network comprises the one or more baseband units, the one or more network radios, and the one or more transmission points; for each SAG, based upon an operators' agreement and the aggregate available frequency spectrum of each transmission point of a SAG, (a) allocate available frequency spectrum to each transmission point and (b) apportion at least a portion of the allocated available frequency spectrum to each baseband unit of the SAG or each output of each baseband unit of the SAG; and for each SAG, cause each apportioned at least a portion of the allocated available frequency spectrum, translated to baseband, to be transmitted to a corresponding baseband unit.

A method comprises: for each transmission point of each spectrum allocation group (SAG) of a radio network (RN), receiving at least one of: one or more available frequency spectrum and a maximum transmit power level for each of the one or more available frequency spectrum, wherein aggregate available frequency spectrum is a sum of the one or more available frequency spectrum received for a transmission point, wherein a SAG comprises one or more baseband units communicatively connected through one output of each the one or more baseband units to one or more network radios, one or more transmission points each of which is electrically connected to one of the one or more network radios, and the one or more network radios, and wherein the radio network comprises the one or more baseband units, the one or more network radios, and the one or more transmission points; for each SAG, based upon an operators' agreement and the aggregate available frequency spectrum of each transmission point of a SAG, (a) allocating available frequency spectrum to each transmission point and (b) apportioning at least a portion of the allocated available frequency spectrum to each baseband unit of the SAG or each output of each baseband unit of the SAG; and for each SAG, transmitting each apportioned at least a portion of the allocated available frequency spectrum, translated to baseband, to a corresponding baseband unit.

A method comprises: for each transmission point of each spectrum allocation group (SAG) of a radio network (RN), receiving at least one of: one or more available frequency spectrum and a maximum transmit power level for each of the one or more available frequency spectrum, wherein aggregate available frequency spectrum is a sum of the one or more available frequency spectrum received for a transmission point, wherein a SAG comprises one or more baseband units communicatively connected through one output of each the one or more baseband units to one or more network radios, one or more transmission points each of which is electrically connected to one of the one or more network radios, and the one or more network radios, and wherein the radio network comprises the one or more baseband units, the one or more network radios, and the one or more transmission points; for each SAG, based upon an operators' agreement and the aggregate available frequency spectrum of each transmission point of a SAG, (a) allocating available frequency spectrum to each transmission point and (b) apportioning at least a portion of the allocated available frequency spectrum to each baseband unit of the SAG or each output of each baseband unit of the SAG; and for each SAG, transmitting each apportioned at least a portion of the allocated available frequency spectrum, translated to baseband, to a corresponding baseband unit.

An apparatus comprises processing circuitry configured to: for each transmission point of each spectrum allocation group (SAG) of a radio network (RN), receive at least one of: one or more available frequency spectrum and a maximum transmit power level for each of the one or more available frequency spectrum, wherein aggregate available frequency spectrum is a sum of the one or more available frequency spectrum received for a transmission point, wherein a SAG comprises one or more baseband units communicatively connected through one output of each the one or more baseband units to one or more network radios, one or more transmission points each of which is electrically connected to one of the one or more network radios, and the one or more network radios, and wherein the radio network comprises the one or more baseband units, the one or more network radios, and the one or more transmission points; for each SAG, based upon an operators' agreement and the aggregate available frequency spectrum of each transmission point of a SAG, (a) allocate available frequency spectrum to each transmission point and (b) apportion at least a portion of the allocated available frequency spectrum to each baseband unit of the SAG or each output of each baseband unit of the SAG; and for each SAG, cause each apportioned at least a portion of the allocated available frequency spectrum, translated to baseband, to be transmitted to a corresponding baseband unit.

DRAWINGS

Comprehension of embodiments of the invention is facilitated by reading the following detailed description in conjunction with the annexed drawings, in which.

DETAILED DESCRIPTION

Figure 1A:
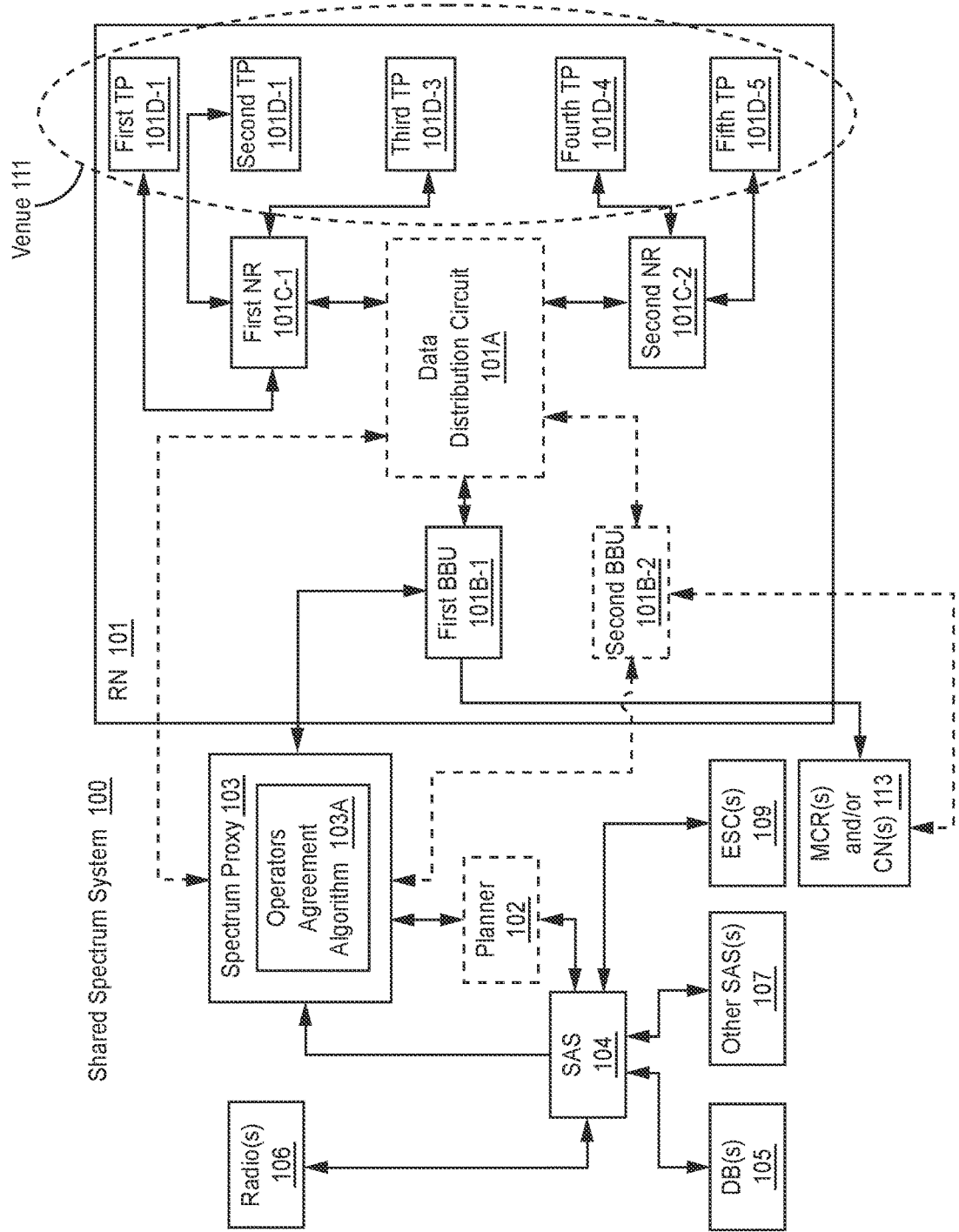
FIG. 1A illustrates a block diagram of one embodiment of a shared spectrum system including a radio network communicatively coupled to a spectrum access system through a spectrum proxy.

Embodiments of an invention provide for planning frequency spectrum and power level (e.g., in effective isotropic radiated power (EIRP)) allocated to transmission points (TPs) of a radio network whose components are controlled by a SAS and which shares spectrum with incumbents and/or other secondary users (e.g., external radio(s)). When the radio network is deployed, other embodiments of the invention provide for a spectrum proxy which facilitates allocation of maximum transmit power level and frequency spectrum with component(s) of the radio network. Optionally, the radio network may be a DAS or a system of at least one cellular radio (SCR(s)).

A radio network (RN) means at least one baseband unit (BBU(s)), at least one network radio (NR(s)), and at least one transmission point (TP(s)), wherein each transmission point is communicatively coupled to one of the NR(s), and wherein each network radio is coupled to one or more of the BBU(s). A baseband unit means a system which processes baseband data, and may be implemented in hardware, e.g., in digital signal processing circuitry, or virtually in a computing system, e.g., a cloud computing system. Optionally, each baseband unit is communicatively coupled to at least one core network (core network(s)); optionally, the baseband unit is communicatively communicated through at least one macro cell (macro cell(s)) to the core network(s). Optionally, each baseband unit communicates data between NR(s) and respectively the core network(s) and/or the macro cell(s).

Optionally, at least one data distribution system (or at least one data distribution circuit or DDC(s)) communicatively couples the NR(s) to the BBU(s).

For a DAS, each network radio is a DAS radio. Further, when the RN is implemented as a digital DAS, the DDC(s) are utilized to couple at least one DAS radio to at least one baseband unit. When the RN is implemented as an analog DAS, the analog DAS does not use the optional DDC(s).

For an SCR(s), each network radio is a cellular radio, e.g., a small cell radio, a pico cell radio, or a femto cell radio. An SCR does not use the optional DDC(s). Each of a small cell radio, a pico cell radio, and a femto cell radio functions similarly to a macro cell radio. Such radios, however, have a much shorter range, e.g., between ten meters and a few kilometers, in comparison to a range of a macro cell radio. Thus, such radios may have a range less than three kilometers. A cellular radio means a radio configured to wirelessly communicate simultaneously with more than one user equipment and be communicatively coupled to a core network.

Optionally, one or more of transmission points electrically coupled to a network radio (e.g., a DAS radio or a cellular radio) may be remotely located from the network radio. Optionally, one or more of transmission points electrically coupled to a network radio may be co-located with the network radio and optionally co-packaged with the network radio.

Unless otherwise indicated herein, power as used herein means power or power spectral density. Conventionally, power levels for a CBRS are characterized in terms of power spectral density levels. Although embodiments of the invention are applicable to and are exemplified in the context of CBRS for pedagogical purposes, the embodiments are applicable to other shared spectrum systems, such as for example licensed spectrum access systems or authorized access systems.

Shared spectrum (or shared frequency spectrum) means frequency spectrum utilized by: (a) incumbent user(s) (e.g., a receiver of a fixed satellite service (FSS)) and/or geographic region(s) to be maintained interference free (e.g., a grandfather wireless protection zone (GWPZ) or priority access license (PAL) protection area (PPA), a geographic location of an environmental sensing capability (ESC) system receiver(s) and/or an exclusion zone) and (b) at least one of priority access licensee (PAL) CBSD(s) and GAA CBSD(s). The CBSD may be a GAA or a priority access license (PAL) CBSD. Optionally, threshold levels mentioned herein may be set by a system designer and/or a system user.

Each TP is a secondary user. Network radio(s) may also be secondary users if registered with the SAS as further discussed herein.

A transmission point means one or more antennas that are communicatively coupled to a network radio, and each of which has an antenna radiation pattern encompassing all or part of a venue. Power emitted by a transmission point is a transmit power of the transmission point; however, for pedagogical purposes, such transmit power of a TP may be referred to as or specified as effective isotropic radiated power.

Other secondary users may be CBSDs and/or network radios. A network radio, however, may or may not be a CBSD. A CBSD may be more generally referred to as a radio. Radio means a radio controlled by a spectrum access system. A network radio may or may not be controlled by the spectrum access system. A network radio means a radio configured to transmit signal(s) to transmission point(s) for emission to user equipment, e.g., mobile phones. The DAS radio may also be referred to as a remote optical unit, a remote radio unit, or a remote unit.

During dynamic operation of the CBRS, embodiments of an invention may be used to manage communications between components of a RN and a SAS of a CBRS system, and to allocate frequency spectrum and maximum transmission power (e.g., in EIRP) to TP(s), BBU(s), and/or NR(s) comprising a RN. Optionally, the foregoing may be implemented with a spectrum proxy, which is subsequently described.

The DAS may be an analog or a digital DAS. An analog DAS distributes analog radio frequency (RF) signals between a base station or baseband unit and a DAS radio. A digital DAS distributes digital signals between a baseband unit and a DAS radio. In either case, at least for part of the distributed signals may be modulated on optical carrier(s).

A CBRS system comprises general authorized access (GAA) and/or priority access license (PAL) CBSDs, and higher priority users. The higher priority users, such as government users for example radar systems, e.g., on ships, have priority access to certain spectrum in the shared spectrum. A SAS grants the CBSDs access to the shared spectrum, including authorizing frequency spectrum (or channels) requested by CBSDs, and authorizing a corresponding requested maximum transmission power or assigning a lower maximum transmission power. The SAS controls the transmission of GAA CBSDs so that PAL CBSDs and the higher priority users are free of interference from GAA CBSDs. The GAA and PAL CBSDs are secondary users; the PAL CBSDs are secondary users because they have lower priority than higher priority users (i.e., incumbents) such as naval vessels. The SAS also controls the transmission of PAL CBSDs so that higher priority users are free of interference from PAL CBSDs.

Free of interference as used herein does not mean an absence of interference, but rather means an acceptable level of interference which may be no interference or a finite level of interference. The acceptable level of interference may vary by geography, frequency spectrum, user type, license type, and/or other indicia.

GAA CBSDs may be of two types: category A (low transmission power) and category B (high transmission power). Category A has a maximum transmission power spectral density of 30 dBm/10 MHz. Category B has a maximum transmission power spectral density of 47 dBm/10 MHz.

Higher priority users of shared spectrum have first, or highest, priority to utilize the shared spectrum controlled by the SAS. Thus, higher priority users (e.g., the receivers of higher priority users' communications systems or radios) shall be able to operate free of interference from other users, e.g., communications systems of priority access licensees and general authorized access users. In one embodiment, the higher priority users include government entities operating systems such as communications systems, operators of fixed satellite communications systems, and grandfathered, prior licensees of the frequency spectrum. Communications systems, as used herein, shall include radar systems (or radars) and satellite ground stations.

In one embodiment, PAL users have second (or intermediate) priority, after higher priority users (excluding PAL users), to utilize the frequency spectrum controlled by the SAS. In another embodiment, a PAL user shall be able to operate, when higher priority users (excluding PAL users) are free of interference of such a PAL user, and free of interference from other PAL users and general authorized access users. In one embodiment, an ability of a PAL user to operate free of interference shall be limited temporally, geographically, and spectrally within the specifications of its license.

GAA users have third, or lowest, priority to utilize the frequency spectrum controlled by the SAS. In one embodiment, an operation of GAA users will be governed by laws, regulations, and/or rules (e.g., pertaining to CBRS). Such laws, regulations, and/or rules may be established by government(s) and/or standards bodies (e.g., WInnForum). For example, such rules shall only let GAA users' CBSDs operate when they do not interfere with communication systems of higher priority users.

In one embodiment, the geographic coverage area proximate to (e.g., covered by radio frequency emissions of) the CBSD may include exclusion zones and protection regions (including location(s) of fixed satellite service(s) (FSS(s)), priority access license (PAL) protection area(s) (PPA(s)), grandfathered wireless protection zone(s) (GWPZ(s)), dynamic protection area(s) (DPA(s)), and receiver(s) of environmental sensing capability (ESC) system(s)) (or ESC system receiver(s)). CBSDs are prohibited from operating in specific frequency spectrum in exclusion zones. Further, the level of interference generated by, e.g., by all non-government users and even some government users (including higher priority and GAA users) shall be limited in a protection region so as not to interfere with certain incumbent(s)' communications systems, for example radar on naval vessels, intended to be protected by the protection region. CBSDs may only operate with the permission of the SAS when an incumbent's communication system is operating in a protection zone. In some cases, this operation will be based upon information received by an environmental sensing capability (ESC) system, from external database(s), notification from an incumbent, and/or from a beacon. One type of protection region is the grandfathered wireless protection zone which is a geographic area and/or frequency spectrum where grandfathered wireless broadband licensees can operate free of interference, e.g., of CBSDs. The foregoing are examples of exclusion zones and protection regions; other type of exclusion and protection regions may occur.

For a CBRS system, a higher priority user consists of at least one of: at least one incumbent, at least one ESC system receiver at least one FSS, and at least one GWPZ. However, more generally, a higher priority user means a receiver of a user, or a region comprising a least one such receiver, where the receiver has a higher priority to receive, in spectrum shared with a secondary radio (or radio), than the radio has to transmit in the share spectrum.

The invention will be subsequently described in more general terms, e.g., using the term radio rather than CBSD, and shared spectrum system rather than CBRS. However, the terms CBRS and CBSD may be subsequently used when illustrating such a system and a device, or their specifications. For purposes of clarity, a network radio (e.g., a DAS radio or a cellular radio) may or may not be a CBSD.

FIG. 1A illustrates a block diagram of one embodiment of a shared spectrum system 100 including a RN 101 communicatively coupled to a SAS 104 through a spectrum proxy (or spectrum proxy circuitry) 103. A planner 102 is communicatively coupled to spectrum proxy 103 and the SAS 104. Optionally, the planner is communicatively coupled to the other SAS(s) 107 and/or the external database(s) 105. For pedagogical purposes, the planner 102 is illustrated as part of the shared spectrum system 100; however, the planner 102 need not be part of the shared spectrum system 100 and may be external to the shared spectrum system 100. When external to the shared spectrum system 100, the planner 102 optionally may be communicatively coupled (permanently or for finite period(s) of time) to the shared spectrum system 100, e.g., to the spectrum proxy 103 and/or the SAS 104; this facilitates the transfer of information between the planner 102 and the spectrum proxy 103 and/or the SAS 104.

The spectrum proxy 103 receives spectrum granted by the SAS 104 to transmission points. The spectrum proxy 103 then allocates the granted spectrum (or a portion thereof) to baseband unit(s) and NR(s) (and optional DDC(s) (if used)) of the RN 101. Optionally, the spectrum proxy 103 may also serve as a domain proxy. The spectrum proxy 103 comprises an operators' agreement algorithm 103A. The operators' agreement algorithm 103A specifies how frequency spectrum allocated to transmission points by the SAS 104 is partitioned at (a) each baseband unit or baseband unit output (and hence to each operator uniquely associated with a baseband unit or baseband unit output), and (b) optionally at each NR. This will be subsequently discussed herein.

The planner 102 is configured to receive initial design information of each TP (or initial TP data) of the RN 101 (e.g., from RN design software) and location of incumbents and external radios (e.g., from the SAS 104 (e.g., through a full activity dump), the other SAS(s), 107, and/or the external database(s) 105), associate the TPs of the RN 101 with interference coexistence group(s) (ICG(s)) and channel coexistence group(s) (CCG(s)), and determines a frequency spectrum and an effective isotropic radiated power of each TP of the RN 101. TP data means data about a TP, e.g., desired TP geographic location, desired transmit power level (for example in EIRP), desired frequency spectrum bandwidth, antenna height, antenna gain, antenna pattern, antenna down tilt angle, and/or antenna azimuthal angle. Desired TP data, such as that illustrated above, is TP data selected by a user of the planner 102 or data generated by the planner 102.

An ICG means a group of TPs that can share the same frequency spectrum (for transmission and optionally for reception). TPs of different ICG(s) may or may not share the same frequency spectrum (for transmission and optionally for reception). If TPs of two different ICGs are sufficiently physically distant so that interference from any TP of one ICG at any TP of the other ICG is below an acceptable threshold, then the two ICGs can share the same frequency spectrum.

External radio(s) mean radio(s) (e.g., CBSD(s)) external to a venue 111 and not part of the RN 101 (and thus not RNs), and which is configured to transmit in shared spectrum controlled by the SAS 104. Each external radio has its maximum transmission power and transmission frequency spectrum controlled by the SAS 104 or one of the other SAS(s) 107. The initial design information may include a TP geographic location, a TP antenna height, a TP antenna azimuth, a TP antenna down tilt angle, a TP antenna pattern, a number of operators utilizing each TP, and/or identification of whether any NR(s) are radio(s) which must register with the SAS 104.

Figure 1B:
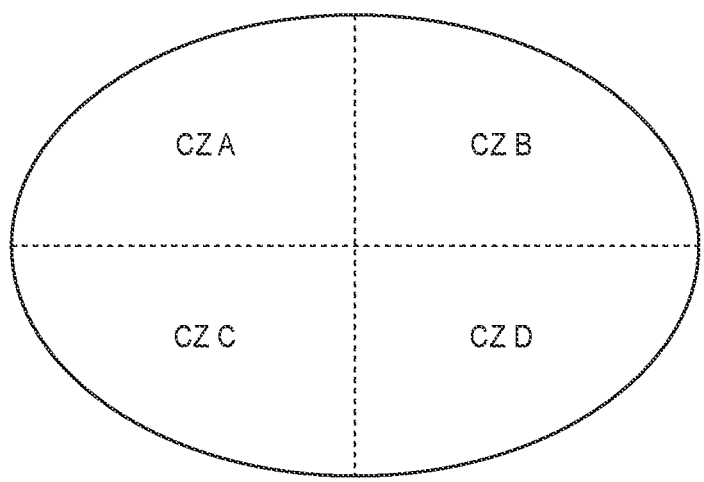
FIG. 1B illustrates a plan view of one embodiment of a venue.

Venue 111 means a geographic location to which the RN 101 is configured to communicate with user equipment in the venue. Optionally, a venue is configured to have a high density of user equipment configured to communicate with the RN 101. Optionally, the venue 111 may be a structure such a stadium or an office building. Optionally, a venue may consist of one or more geographical areas (or coverage zones). FIG. 1B illustrates a plan view of one embodiment of a venue 111. The illustrated venue 111 consists of four coverage zones CZ A, CZ B, CZ C, and CZ D. Although the coverage zones are illustrated as having equal areas, coverage zones may have differently sized areas.

Returning to FIG. 1A, optionally, the planner 109 comprises software stored in and executed by a processing system (or circuitry) such as a state machine, a neural network, and/or a quantum computer. Optionally, the processing system may be a cloud computing system. Optionally, the state machine comprises processor circuitry coupled to memory circuitry. The processor circuitry may execute the software stored in the memory circuitry. The planner 109 may be executed by the same processing system that executes the SAS 104 and/or the spectrum proxy 103. Optionally, the planner 102 may be executed by a processing system within the RN 101, e.g., in an optional data distribution circuit (if used). The planner 102 implemented in a processing circuitry may be referred to as planner circuitry. The planner 102 may be used to determine how transmission points are grouped, and the transmission power (e.g., in EIRP) and bandwidth of frequency spectrum satisfies design criteria of a RN.

The shared spectrum system 100 comprises the SAS 104 communicatively coupled, e.g., by communications link(s) (optionally the Internet), to the spectrum proxy 103. Optionally, the SAS 104 is communicatively coupled to at least one radio (radio(s)) 106; optionally, the SAS may be coupled to one or more RNs. Such radio(s) 106 comprise part or all of the external radio(s). The SAS 104 is configured to control when the radio(s) 106 can transmit in shared spectrum, the maximum transmit power level (e.g., in effective isotropic radiated power (EIRP) level of each of the radio(s) 106, and the frequency spectrum in which each of the radio(s) 106 may transmit. Optionally, the radio(s) 106 are communicatively coupled to the SAS 104 by the Internet and/or radio access network(s). The SAS similarly controls TP(s) and optionally NR(s).

Optionally, the SAS 104 is communicatively coupled to at least one environmental sensing capability system (ESC(s) or ESC circuitry) 109. Each ESC comprises receiver(s) and is configured to detect the presence of incumbents in one or more dynamic protection area. The SAS 104 is further communicatively coupled to at least one other SAS (other SAS(s)) 107; each of the other SAS(s) 107 are configured to control a unique set of radios. The SAS 104 and the other SAS(s) 107 are configured to share information about the radios under each SAS's control. Optionally, each of the other SAS(s) 107 provides the SAS 104 a full activity dump (FAD) comprising protection areas for PAL(s) managed by the other SAS, geographic location, and an antenna height, an antenna pattern, an antenna azimuth, an antenna down tilt, and/or interference thresholds for receivers of ESC(s) utilized by the other SAS, and information about which radios (controlled by the other SAS) are authorized by the other SAS to transmit in the shared spectrum (or active radios). Optionally, the PAL protection area (PPA) comprises protection points; the PPA is a geographic area around a PAL that protects the PAL and user equipment communicating with the PAL from interference above a certain interference threshold level (e.g., −96 dBm/10 MHz).

Information about active radios may include installation parameters (e.g., an antenna geographic location, an antenna height, an antenna azimuth, an antenna down tilt angle, an antenna, pattern, and/or a maximum authorized transmit power (in EIRP). The foregoing information is used by the SAS 104 to protect ESC(s) and radios identified by the other SAS(s) 107 from interference from radios managed by the SAS 104. Optionally, such information is automatically provided periodically to the SAS 104, e.g., every twenty-four hours, and/or upon request of the SAS 104.

Optionally, the SAS 104 comprises software stored in and executed by a processing system (or circuitry) such as a state machine, a neural network, and/or a quantum computer. Optionally, the state machine comprises processor circuitry coupled to memory circuitry. The processor circuitry may execute the software stored in the memory circuitry. The SAS 104 implemented in a processing circuitry may be referred to as SAS circuitry.

The SAS is further communicatively coupled to at least one external database (DB(s)) 105; optionally, the external database(s) 105 comprises a database of data about incumbents (e.g., location of protection point(s) representing incumbent, type of incumbent, and corresponding interference threshold). Optionally, the external databases may be managed by a government agency (e.g., the U.S. Federal Communications Commission) and/or by a standard body (e.g., WInnForum). A protection point means a lateral geographic location where an incumbent is or may be located, or a geographic region (e.g., PAL protection area or location of an ESC system receiver) which must be free of interference by secondary users, e.g., radios (e.g., external radios) and TPs.

If the RN 101 is implemented with the architecture of a digital DAS, then the RN 101 comprises the optional DDC(s) communicatively coupled to each BBU of the RN 101, each NR of the RN 101, and the spectrum proxy 103; each NR of the RN 101 would be a DAS radio. For pedagogical purposes, FIG. 1A illustrates a single DDC 101A, although optionally more than one DDC may be used in the RN 101. Optionally, the NR(s) can be communicatively coupled to the spectrum proxy 103; the NR(s) can be communicatively coupled to the spectrum proxy 103 in addition to or in lieu of communicatively coupling the optional data distribution circuit(s) (when used) to the spectrum proxy.

A RN 101 includes at least one baseband unit communicatively coupled to at least one NR; if the RN 101 is a digital DAS, then the BBU(s) would be communicatively coupled to NR(s), which would be DAS radio(s), through the DDC(s). Each NR is electrically coupled to at least one transmission point (or antenna). For pedagogical purposes, FIG. 1A illustrates two baseband units (or baseband circuits; a first baseband unit (BBU) 101B-1 and an optional second baseband unit 101B-2). In FIG. 1 A, each baseband unit is illustrated as being communicatively coupled to two NRs (a first NR 101C-1 and a second NR 101C-2); if the RN 101 is a digital DAS, then each baseband unit is communicatively coupled to the two DAS radios through DDC(s), e.g., the illustrated DDC 101A.

Each baseband unit may be a physical baseband unit co-located with the other components of the RN 101, e.g., as used in 4G LTE compatible RNs, or virtual baseband units that are remotely located from the other components of the RN, e.g., as proposed for O-RAN Alliance specification O-RAN distributed units to be utilized by 5G compatible RNs. Such virtual baseband units may be in remote server(s) such as a cloud computing system. Each physical and/or virtual baseband unit may have one or more outputs (output(s)) configured to be communicatively coupled to NR(s) and to TP(s). If the RN is a digital DAS, then such output(s) are communicatively coupled through DDC(s) to the NR(s). Each output is a port and may optionally be referred to as a cell. Each output of a baseband unit has a unique identifier, e.g., a cell identifier. Each output of a baseband unit is coupled by and through the baseband unit to a core network of an operator; thus, data is conveyed between corresponding TP(s) and NR(s) and the core network through a corresponding output of a baseband unit. Optionally, each BBU is communicatively coupled to at least one macro cell radio (MCR(s)) and/or at least one core network (CN(s)) 113. The RN 101 communicates information, e.g., data, between the MCR(s) and/or CN(s) 113 and user equipment configured to form wireless communication link(s) with the TP(s) and NR(s).

For pedagogical purposes, the first baseband unit (BBU) 101B-1 and the second baseband unit 101B-2 of the RN 101 are illustrated as being located with other components of the RN 101. However, not all components of the RN 101 need to be co-located; some components, e.g., the baseband unit(s), of the RN 101 may be located remotely or far apart from other components of the RN 101. Thus, some or all of the components (e.g., the TP(s), the NR(s), and/or the optional DDC(s) (if used)) of the RN 101 may be located in or by the venue 111. However, at a minimum, some or all of the TP(s) are located in or by the venue 111.

Each NR is electrically coupled to one or more transmission points. For pedagogical purposes, the first NR 101C-1 is illustrated as being electrically coupled to a first transmission point 101D-1, a second transmission point 101D-2, and a third transmission point 101D-3, and the second NR 101C-1 is illustrated as being electrically coupled to a fourth transmission point 101D-4 and a fifth transmission point 101D-5.

The spectrum proxy 103 is, at least in part, a domain proxy. A domain proxy is configured to:
(a) manage communications between the SAS 104 and component(s) of the RN 101 (e.g., individual and/or groups of NR(s), optional data distribution circuit(s) (if used), and/or baseband unit(s)); and
(b) optionally, translate communications protocols used by the SAS 104 and component(s) of the RN 101. The spectrum proxy 103 is configured to
The spectrum proxy 103 is communicatively coupled, e.g., by communication link(s) for example Ethernet network(s) and/or the Internet, to components of the RN 101.

The operators' agreement algorithm 103A is based upon an agreement of operators, e.g., communications service providers for example cellular service providers, which utilize the RN 101. An operators' agreement may allocate spectrum equally or unequally amongst operators who are parties to the operators' agreement. Optionally, one or more operators are allocated at a TP a fixed percentage of frequency spectrum utilized by a TP of the RN 101. As is described elsewhere herein, the frequency spectrum utilized by a TP (and a corresponding NR) may be less than the frequency spectrum assigned to the TP by the SAS 104 because the spectrum proxy 103 can assign frequency spectrum to the TP that is less than the frequency spectrum assigned by the SAS 104. Optionally, one or more operators are allocated at a TP a variable percentage of available spectrum; for example, one or more operators may only receive corresponding percentages of the assigned spectrum if the assigned spectrum has a bandwidth greater than a threshold bandwidth. Thus, the operators' agreement algorithm 103A is dependent upon the operators' agreement.

Optionally, the spectrum proxy 103, including the operators' agreement algorithm 103A, comprises software stored in and executed by a processing system (or circuitry) such as a state machine, a neural network, and/or a quantum computer. Optionally, the processing system may be a cloud computing system. Optionally, the state machine comprises processor circuitry coupled to memory circuitry. The processor circuitry may execute the software stored in the memory circuitry. The spectrum proxy 103, and thus the operators' agreement algorithm 103A, may be executed by the same processing system that executes the SAS 104 and/or the planner 102. Optionally, the spectrum proxy 103 may be executed by a processing system within the RN 101, e.g., in an optional data distribution circuit (if used). The spectrum proxy 103 implemented in a processing circuitry may be referred to as spectrum proxy circuitry.

Figure 2:
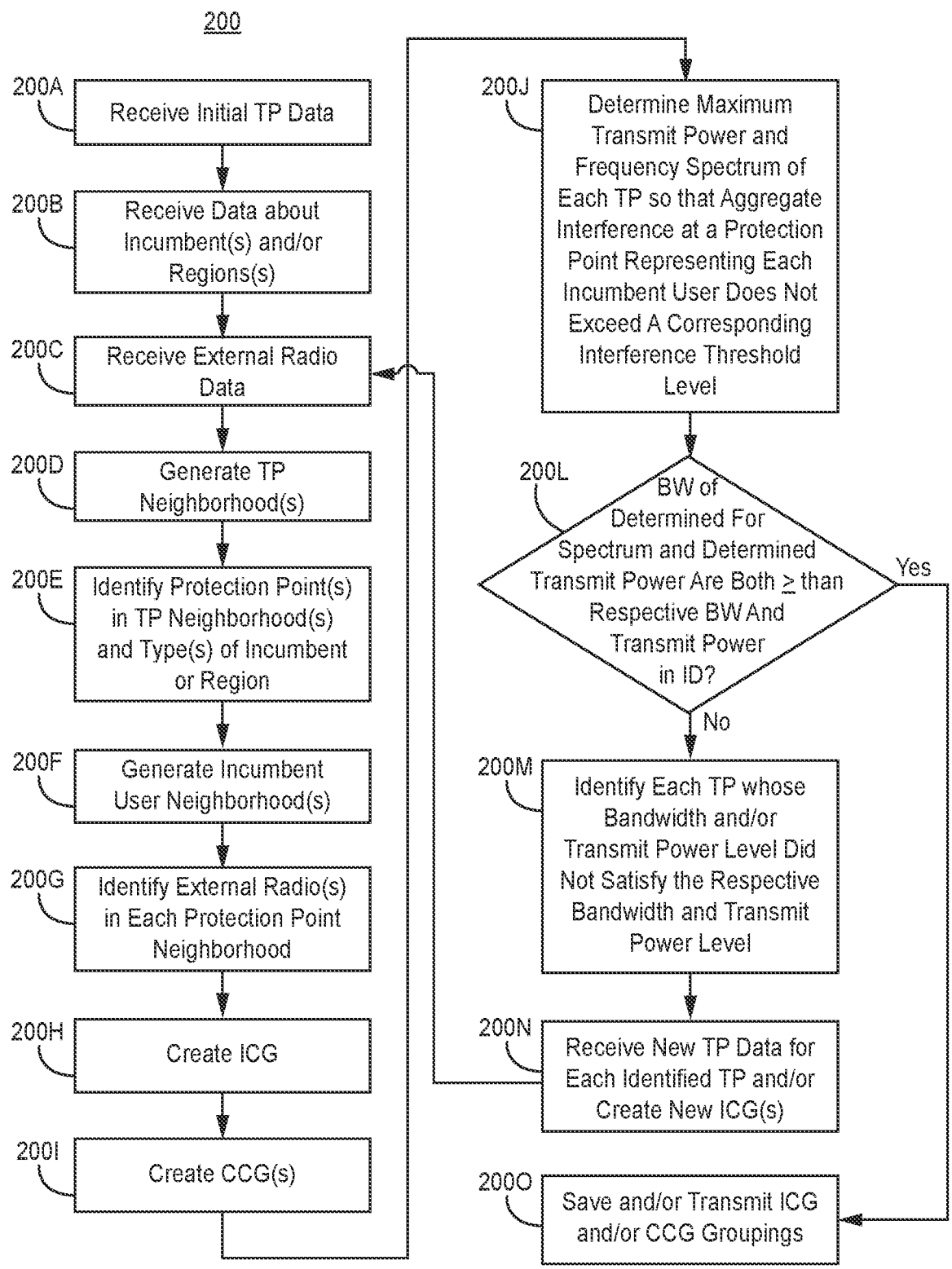
FIG. 2 illustrates a flow diagram of one embodiment of a method for planning a deployment of a radio network that part of a shared spectrum system.

FIG. 2 illustrates a flow diagram of one embodiment of a method 200 for planning a deployment of a radio network that part of a shared spectrum system. To the extent that the methods shown in any of the Figures is described herein as being implemented in the system shown in FIG. 1A, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 200A, initial data (ID) for each TP of a RN is received, e.g., from a RN design tool. Optionally, the initial data comprises at least one of: a frequency spectrum bandwidth[1] for each TP, a maximum transmit power for each TP, geographic location for each TP, neighborhood area parameter(s) (e.g., a radius of a circular neighborhood) for each TP, and geographic information about the venue 111 (e.g., geographic boundary and/or a geographic center of the venue 111). The RN design tool is configured to determine locations of TPs in a venue 111 so that the RN 101 provides coverage, for some or all communications system (e.g., cellular system) operators utilizing the RN 101, throughout the venue 111 or at least those portions of the venue 111 where coverage is desired. Communications system operators utilizing the RN 101 may be referred to as operators. Optionally, geographic information about the venue 111 (e.g., coordinates defining the boundary of the venue 111) is received and from which optionally a geographic center (e.g., a lateral geographic center of the venue 111 for example in latitude and longitude) may be derived.

[1]Bandwidth for each TP is inherently specified in the initial data if only frequency spectrum for each TP is specified in the initial data.

Optionally, in block 200B, incumbent data for at least one of: (a) at least one incumbent and (b) and at least one region to be maintained free of interference in the shared frequency spectrum is received; such data may be referred to herein as incumbent/region data. Optionally, the incumbent/region data includes, for each incumbent or region, at least one of: an identifier of type of an incumbent or region, a geographic location (e.g., a geographic point or area location) of each incumbent or region, a, e.g., receive, frequency spectrum for each incumbent or region, a geographic location of each protection point representing each incumbent or region, neighborhood area parameter(s) (e.g., a radius of a circular neighborhood) for each incumbent or region for each type of incumbent and region, and a corresponding interference threshold for each incumbent or region, e.g., based upon type of incumbent or region. For the planner, a neighborhood means a geographical area centered around (a) a TP and in which an incumbent or region may reside at least in part, or (b) an incumbent or region and in which external radio(s) or TP(s) may reside (and as further explained herein).

Optionally, in block 200C, external radio data (or data about external radio(s)) is received. The external radio data includes at least one of: geographic location of each external radio, a maximum transmit power of each external radio, and a transmit frequency spectrum for each external. Optionally, the external radio data is received from the SAS 104, the other SAS(s) 107, the external database(s) 105, and/or any other source.

Optionally, in block 200D, TP neighborhood(s) are generated. Optionally, a TP neighborhood may be generated around a geographic location of each TP or around the geographic center (e.g., lateral geographic center for example in latitude and longitude) of the venue 111. The geographic area (e.g., centered around each TP or the geographic center of the venue 111) of each TP neighborhood may be designated by the planner, a user of the planner, by law, regulation or specification, or be designated in or using the initial data (e.g., corresponding TP location and corresponding neighborhood area parameter(s)) provided for each TP.

Optionally, in block 200E, each protection point, representing an incumbent or a region, in each transmission point neighborhood is identified. Optionally, a type of each incumbent or region is also identified. Optionally, in block 200F, a protection point neighborhood is generated around each protection point identified in each TP neighborhood. The geographic area (e.g., centered around each protection point) of each protection point neighborhood may be designated by the planner, a user of the planner, by law, regulation or specification, or be designated in or using the incumbent data (e.g., corresponding protection point location and corresponding neighborhood area parameter(s)) provided for an incumbent represented by the corresponding protection point or an incumbent type designated for such incumbent. The geographic area of each protection neighborhood may vary by type of corresponding incumbent or region. Optionally, in block 200G, each TP (and optionally at least one external radio) is identified within each protection point neighborhood.

In block 200H, all TPs of the RN are designated as part of the same ICG; thus, an ICG is created with all TPs of the RN. In block 200I, all TP(s) connected to the same NR are designated as part of the same CCG; thus, a unique CCG is created for each set of TP(s) connected to a unique NR. A TP is connected to a NR when it is configured to communicatively couple radio signals between user equipment, e.g., mobile phone(s), and the NR.

In block 200J, a maximum transmit power level (e.g., in EIRP) and a frequency spectrum of each TP is determined so that aggregate interference, in shared frequency spectrum, at each protection point (determined in 200E) does not exceed an interference threshold level of a corresponding protection point, wherein the aggregate interference is from each transmission point (and optionally each external radio) identified in a protection point neighborhood around the corresponding protection point. Optionally, each type of incumbent or region may have a different threshold interference level. Optionally, the maximum transmit power (e.g., in EIRP) of each TP in block 200H is determined using an iterative allocation process (IAP); however, other techniques may be used. WInnForum general requirement (requirement) R2-SGN-16 of WINNF-TS-0112 defines the IAP, and is incorporated by reference herein in its entirety. The IAP determines maximum transmit power levels by allocating interference margin fairly to TPs in neighborhood(s) of protection point(s) proximate to the TPs. The IAP determines such transmit power levels by allocating interference margin fairly to TPs in neighborhoods of protection point(s) for a certain combination of frequency spectrum mapped to the TP(s), and optionally the NR(s). The foregoing is performed for different combinations of frequency spectrum mapped to the TPs, and optionally the NR(s). A frequency spectrum mapping is selected that results in a maximum average transmission power for each TP, while adhering to the corresponding threshold interference levels discussed herein.

Figure 3:
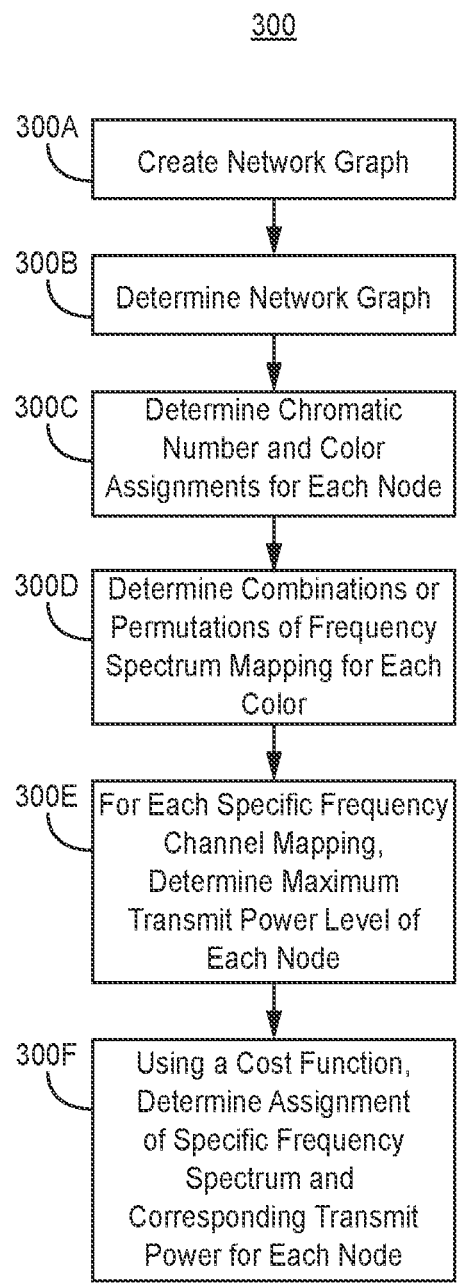
FIG. 3 illustrates one embodiment of a method for determining maximum transmit power and frequency spectrum of transmission points of a radio network.

FIG. 3 illustrates one embodiment of a method 300 for determining maximum transmit power and frequency spectrum of TPs of a RN. Thus, FIG. 3 illustrates an optional means of implementing block 200J.

In block 300A, a network graph is created. The network graph comprises one, two, three, or more nodes, where one node comprises each TP of the RN, registered as part of a SAS. Optionally, other node(s) comprise at least one external radio each of which is registered to a SAS; the external radio(s) may each be registered to different SAS(s). Techniques for determining frequency spectrum assignment are disclosed in Patent Cooperation Treaty patent application PCT/US2020/019410 filed on Feb. 24, 2020 (entitled "METHOD AND SYSTEM FOR ENHANCING CAPACITY OF RADIOS SHARING SPECTRUM"), which is hereby incorporated by reference herein in its entirety.

In block 300B, determine an interference network graph (ING) for external radio(s) and the TPs of the RN of the SAS based upon at least one region of overlap of cell coverage areas, wherein each region of overlap is an overlap of cell coverage areas of an external radio and the transmission points of the RN, which can be determined using external radio and TP parameters (e.g., antenna geographic location, transmit power level, antenna height, antenna azimuth, antenna pattern, and/or antenna gain) and path loss between the venue 111 and each external radio and between each external radio. The interference network graph is determined using the network graph created in block 300A. The interference network graph comprises a node including transmission points of the RN. The interference network graph comprises at least two nodes and at least one interference edge connecting two nodes. At least one node (which does not represent an RN) is formed by a set of one or more external radios; optionally, the set of one of more radios are associated with the same operator. Optionally, for a node that represents an RN, the node may comprise one or more transmission points utilized by more than one operator and hence which receive and emit signals associated with more than one operator. One node of the interference network graph is formed by the TPs of the RN and at least one other node of the interference network graph is formed by the set of one or more external radios. However, one or more different nodes may correspond to sets of TP(s) or external radio(s) operated by different operators.

Optionally, the node may be a vertex connecting one or more lines. Lines between, and thus connecting, two vertices represent an interference edge. Each vertex of an interference edge is a node representing transmission point(s) or external radio(s), such as a node (at the venue 111) representing the TPs of the RN. An interference edge means an overlap region formed by overlapping coverage areas around the two corresponding nodes. Cell coverage area means a perimeter around external radio(s) or TP(s) comprising a node corresponding to a minimum power level, emitted by the external radio(s) or TP(s) as the case may be, that can be detected by user equipment, e.g., −96 dBm/MHz. Optionally, the coverage area of the TP(s) may encompass the venue 111 and geographic areas outside of the venue 111.

The overlap region as used in the aforementioned definition of interference edge may be any overlap region or an overlap region have at least one parameter exceeding a corresponding interference edge threshold level. In one embodiment, the existence of an interference edge can be numerically determined based upon an area of the overlap region with respect to the areas of the overlapping cell coverage areas. An interference edge exists between first and second nodes if a sum of a first edge parameter and a second edge parameter exceeds the interference edge threshold level. The interference edge threshold level may be established by a system designer, e.g., of the SAS or planner, or by regulation, law, or specification. The first edge parameter equals a ratio of: (a) an area of the overlap region with respect to (b) the area of the cell coverage area of the second node. The second edge parameter equals a ratio of: (a) the area of the overlap region with respect to (b) the area of the cell coverage area of the first node.

Alternatively, the interference edge can be numerically determined based upon signal level and compared against the interference edge threshold level. An interference edge exists between first and second nodes if a sum (of a first edge parameter and a second edge parameter) divided by two exceeds the interference edge threshold level. The first edge parameter is a ratio of an average power level of radio(s) (or TP(s) of a first node in an overlap region to average power level of radio(s) of a second node in the overlap region. The second edge parameter is the inverse of the first edge parameter. Average power level of radio(s) may be determined by: (1) forming a grid of points in the overlap region, (2) estimating, at each point, the transmit power level of each of the radio(s) of the first node and the second node, and (3) generating an average transmit power level by summing the estimated powers at each point separately for each of the first node and the second node, and dividing each of the two summations by the number of points at which power was estimated. The power level at each point can be estimated utilizing the maximum transmission power level granted to each of the corresponding external radio or TP and the path loss based on a propagation model such as the irregular terrain model (ITM). The power level at each point is also estimated using other parameters of the external radio and/or the TP, such as antenna geographic location, antenna height, antenna gain, antenna down tilt angle, antenna pattern, and/or antenna azimuth angle.

In block 300C, a chromatic number and a color assignment is determined for each node of the interference network graph. The chromatic number means at least one of—a minimum number and a most probable minimum number[2]—of distinct frequency spectrum required so that no two sets of external radios and TPs of the RN at any interference edge use the same frequency spectrum. Each of the nodes sharing an interference edge is assigned a unique color. The minimum number of colors which can be used in the interference network graph is the chromatic number.

[2] Probable minimum number means a number that has the highest probability of being the minimum number.

A specific frequency spectrum may also be referred to as or represented by a specific color. Specific frequency spectrum means a frequency channel. When utilizing a number of specific frequency spectrum equal to the chromatic number, it is possibly that two or more nodes, where each node represents TP(s) or external radio(s), may utilize the same specific frequency spectrum, e.g., because their nodes are distant and do not interfere with one another (e.g., interference between their nodes is below the interference edge threshold level or because (a) the TPs of the venue or (b) the external radio(s) of two or more nodes are part of an interference coordination group where interference is managed by the design or planning. When TPs of a venue are part of an Interference Coordination Group no edge is assumed between the TP of the venue. Determining the minimum number of colors is a non-deterministic polynomial time problem for which a Greedy like algorithm may be used to heuristically determine the chromatic number which may be the minimum number of colors or a number close to the minimum number of colors.

In block 300D, determine combinations or permutations of color to specific frequency spectrum mappings (or specific frequency spectrum mappings) for a number of frequency spectrum, n, that can be assigned to the ING node comprising TP(s) (and thus to the TP(s)) of the RN (and optionally to the ING node(s) each of which comprises external radio(s), and thus to the external radio(s) comprising ING node(s)) in each of the nodes of the interference network graph. The frequency spectrum mapping maps each assigned color to a unique frequency spectrum (or frequency channel). Such a determination is intended to improve (or enhance) the transmit power-bandwidth product of each external radio and the TPs, reduce interference amongst external radios of different network operators and amongst the external radios and the TPs, and/or to enhance stability of the corresponding shared spectrum communications system, e.g., due changes to specific frequency spectrum either requested by or previously assigned to external radios. Opportunistic spectrum sharing divides the total available shared spectrum (e.g., controlled by the SAS and which is for example 150 MHz) by the chromatic number, z, so that all available specific frequency spectrum (or all available frequency channels) are utilized by the external radios and the TPs. All possible permutations of m specific frequency spectrum mappings are determined in block 300D for opportunistic spectrum sharing. For opportunistic spectrum sharing, n is equal to the chromatic number z. Hence, for opportunistic spectrum sharing, the combinations of n is n!.

Non-opportunistic spectrum sharing entails assigning a fixed specific frequency spectrum bandwidth, e.g., 10 MHz. Thus, the total number of available specific frequency spectrum (or available frequency channels), n, is the total available bandwidth divided by fixed specific frequency spectrum bandwidth, e.g., 15 available specific frequency spectrum (or available frequency channels). For non-opportunistic spectrum sharing, the determined combinations of specific frequency spectrum that can be assigned in block 300D comprises combinations of $$\binom{n}{z}$$

of the chromatic number z, where $$\binom{n}{z} = \frac{n!}{z!(n-z)!}.$$

For non-opportunistic spectrum sharing, n is greater than z. All possible combinations of specific frequency spectrum-to-color assignment (or specific frequency spectrum mapping m) is determined in block 300D for opportunistic spectrum sharing.

Optionally, determine whether opportunistic frequency spectrum sharing or non-opportunistic frequency spectrum sharing is being used. If opportunistic frequency spectrum sharing is being used, then the determined combinations are the permutations of chromatic number. If non-opportunistic frequency spectrum sharing is being used, then the determined combinations are the combinations of $$\binom{n}{z}$$

of the chromatic number.

In block 300E, for each specific frequency spectrum mapping of the determined combinations or permutations of specific frequency channel mappings that can be assigned to each node of external radios and to each TP, a maximum transmit power level is determined for each external radio and each TP of each node so that an aggregate interference level at the at least one protection point (determined in block 200E) will not exceed an aggregate interference threshold level. $P_k$ represents the maximum transmit power level, e.g., in mW/MHz or another unit of power and frequency. k represents one of the external radio(s) or the TPs of a node of the interference network graph. m represents one of the sets for assigning specific frequency channels to different nodes (and thus to the TPs comprising those nodes).

Note, the interference network graph may or may not be redetermined upon performing block 300E. For pedagogical reasons, the interference network graph will not be exemplified as being recalculated. Sometimes recalculating the interference network graph using the determined maximum transmit power levels can result in system instability.

Protection points are points determined in block 200E and where a primary user or its user equipment may be located, and at which aggregate interference from secondary users, e.g., external radio(s) and TP(s), must not exceed an aggregate interference threshold level to limit interference to receivers of the primary users which may be at such points. The protection points are fixed in location and deemed to have a receiver receiving all the time at the protection point. The aggregate interference threshold level may be set by a standards body or by government(s).

If a TP does not interfere with any protection points, the maximum transmit power level of the TP is the transmit power level, e.g., transmit power level, e.g., in EIRP, requested by the TP. If one or more of the TPs comprising nodes of the interference network graph interferes with one or more protection points, then determine the maximum transmit power level of those interfering TP(s) so that the interference at each protection point does not exceed an aggregate interference threshold level. If a TP interferes with two or more protection points, the maximum transmit power level of the TP is the minimum transmit power spectral density level calculated for the TP with respect to each protection point which the TP interferes.

In one embodiment, the maximum transmit power level of a TP interfering with a protection point is determined using the IAP. However, other techniques may be used. The IAP determines such maximum transmit power levels of TPs by allocating interference margin fairly to TPs in neighborhood(s) of protection point(s) proximate to the TPs. The IAP determines such transmit power levels by allocating interference margin fairly to TPs in neighborhoods of protection point(s), e.g., of one or more of each of a fixed satellite service (FSS), a priority access license (PAL) protection area (PPA), a grandfathered wireless protection zone (GWPZ), and an environmental sensing capability (ESC) system.

Optionally, the resulting maximum transmit power level for each TP of each node may be stored in a three-dimensional matrix, e.g., a database, and/or in a three-dimensional graphical plot having the following three variables (e.g., indices): TP node identifier, TP transmit power level, and frequency channel assignment number. Each frequency channel assignment number corresponds to a different set for assigning specific frequency spectrum, e.g., a different combination or permutation respectively for non-opportunistic and opportunistic spectrum sharing.

In block 300F, using a cost function, determine an assignment of specific frequency spectrum (or frequency channels) to the TPs of each node that results in at least one of: (a) an enhanced transmit power-bandwidth product or respectively an enhanced probable transmit power-bandwidth product[3] for all TPs, (b) diminished interference between radios of different network operators (and hence nodes), and (c) diminishing changes to specific frequency spectrum either requested by or previously assigned to TPs. Optionally, the interrelationship between enhancing transmit power level, diminishing interference, and diminishing specific frequency spectrum changes can be manipulated by adjusting weighting factors for each of the foregoing; an example of this will be subsequently described. Further, the assignment may or may not be made using constraints.

[3] Probable transmit power-bandwidth product is a transmit power-bandwidth product that has a highest probability of being the maximum transmit power-bandwidth product.

In one embodiment, the assignment is determined by determining a value for a cost function for each possible unique, e.g., a combination or a permutation, of assignments of specific frequency spectrum. The determined value may be a maximum or a minimum value depending upon the cost function.

An exemplary cost function is illustrated for pedagogical reasons. However, other cost functions may be utilized. At least one of a specific frequency spectrum assignment for improving TP transmit power-bandwidth product, a specific frequency assignment for diminishing interference, and a specific frequency assignment for maintaining stability for all TPs (e.g., diminishing changes to frequency channels either requested by or previously assigned to TPs) is determined with respect to this exemplary cost function. The exemplary cost function, C(m), is:

$$C(m)=f(z,N,T_k(n),I_k(m),\text{maxBW},\text{PCAT}_k),$$

where $T_K(m)$ is the throughput function of a $k^{th}$ TP for a $m^{th}$ frequency channel mapping;

$I_K(m)$ is the average interference to the $k_{th}$ TP from other TPs for the $m^{th}$ frequency channel mapping m;

maxBW is the maximum bandwidth for a TP, e.g. ~150 MHz; however, the maximum bandwidth can be larger or smaller; $\text{PCAT}_k$ is a maximum power (e.g., mW) of the $k^{th}$ TP;

N is the number of TPs in the interference network graph;

$$T_k(m)=P_k(m)*BW_k(m),$$

where $P_k$ (M) is transmit power level (e.g., mW/MHz);

$BW_k$ is a bandwidth for the $k^{th}$ TP for the $m^{th}$ channel mapping;

$I_k$ (m)=$\Sigma_{l \neq k}^{N} I_l$ (m), where $I_k$ is the aggregate interference from other TPs at a $k^{th}$ TP in overlapping bandwidth, where $I_l$(m) is an interference (e.g., mW) at the $k^{th}$ TP from a $l^{th}$ TP in the overlapping bandwidth, and where the interference $I_k$=0 if all frequency channels are orthogonal; and z is the chromatic number.

When determining—using the cost function—at least one of the specific frequency spectrum and transmit power level, constraints may or may not be used. If used, the constraints may include, for example, one or more of the following:

(a) assigning contiguous specific frequency spectrum to operators (coordinated operators) using the same radio access technology (RAT), transmission synchronization of network TPs (e.g., to minimize co- or inter-channel interference), and timing of uplink and downlink signals in time division duplexing networks, are assigned adjacent frequency channels. Other operators (non-coordinated operators)—using different at least one of RATs, synchronization, and uplink downlink timing—are assigned frequency channels that are not adjacent to the frequency channels assigned to the coordinated operators; this reduces bandwidth of guard bands employed by a SAS; and (b) an absolute value of a difference between (i) an individual TP transmit power level and (ii) an average transmit power level of the set of TPs (utilizing the same specific frequency spectrum as the individual TP) less than a delta power threshold level, e.g. 10 dB (however the delta power threshold level may be smaller or larger).

The specific frequency spectrum assignment may be determined using the determined maximum transmit power level for each set determined in block 300D, or for y sets of specific frequency spectrum assignments having highest determined maximum transmit power level as determined in block 300E. The y sets are a subset of the sets of frequency channel assignments determined in block 300D and the number y may be specified, e.g., by a system designer or by a standards body. As illustrated in the cost function exemplified above, variable values other than transmit power level may be used to determine specific frequency spectrum assignments.

Returning to FIG. 2, in block 200L, for each TP, determine if both (a) bandwidth of the determined frequency spectrum is greater than or equal to the frequency spectrum bandwidth of a corresponding TP provided in the initial data and (b) the determined transmit power level (e.g., in EIRP) is greater than or equal to a maximum transmit power level of the corresponding TP provided in the initial data. Optionally, the frequency spectrum bandwidth and/or the transmit power level may be the same for all TPs of the RN.

If for at least one TP both (a) the bandwidth of the determined frequency spectrum and (b) the determined transmit power level are not greater than or equal to the respective the frequency spectrum bandwidth and the transmit power level, then proceed to block 200M. If for all TPs both (a) the bandwidth of the determined frequency spectrum and (b) the determined transmit power level are greater than or equal to the respective the frequency spectrum bandwidth and the transmit power level, then proceed to block 200O. In block 200O, the ICG(s) and/or CCG(s) are saved and/or sent, e.g., transmitted, to the spectrum proxy 103. Spectrum proxy 103 may utilize such ICG(s) and/or CCG(s) before forwarding, e.g., transmitting, TP registration messages including identifiers for the ICG and the CCG with which the TP is associated, to the SAS 104; thus, an ICG and a CCG would be identified in corresponding registration messages of a TP associated with the ICG and the CCG. Thus, an ICG identifier and a CCG identifier, for each TP of the RN, may be saved and/or transmitted to the spectrum proxy 103 and/or the SAS 104. This is further exemplified with respect to block 500B of FIG. 5.

In block 200M, identify each TP for which both conditions of block 200L were not met. In block 200N, new TP data is received for the identified transmission point(s) and/or at least one new ICG is created. The new TP data comprises modification of some or all of the initial TP data received in block 200A for one or more of the TPs (e.g., antenna geographic location, modified antenna height, modified antenna azimuth, modified antenna down tilt angle, modified, antenna gain, and/or modified antenna pattern) for the identified TP(s). The new ICG(s) may be created by identifying two or more groups of TPs, where TPs comprising each ICG are not expected to cause interference above a corresponding interference threshold level with one another when using the same frequency spectrum. The new ICG(s) may or may not include the TP(s) identified in block 200M. New ICG(s) can be determined using propagation modelling and calculating interference amongst TPs in proposed or actual new ICG(s). Optionally, upon completion of block 200N, proceed to block 200C

Figure 4A:
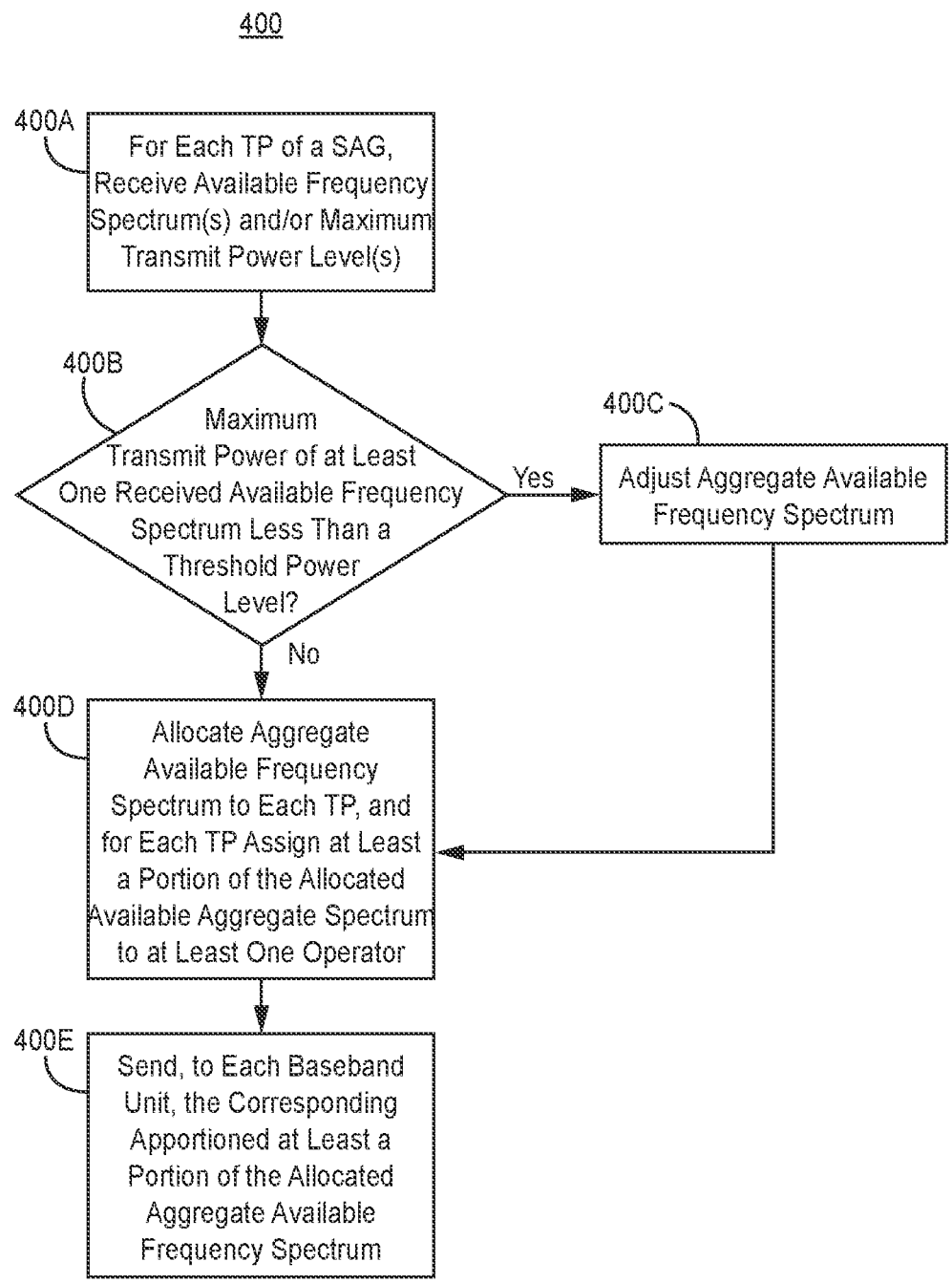
FIG. 4A illustrates a flow diagram of one embodiment of a method of implementing a spectrum proxy.

The spectrum proxy will now be further described. FIG. 4A illustrates a flow diagram of one embodiment of a method 400 of implementing a spectrum proxy. The process illustrated in FIG. 4A is performed for each spectrum allocation group of a RN. Optionally, the method 400 may be performed when a spectrum inquiry or a grant request is performed.

Spectrum allocation group (SAG) means a group of one or more baseband units assigned a same (or common) frequency spectrum and communicatively connected (through one output of each the one or more baseband units) to one or more radios, of the RN, assigned the frequency spectrum, one or more transmission points assigned the frequency spectrum, where each transmission point is electrically connected to one of the NR(s), and the NR(s). Optionally, an output of a baseband unit may represent a cell or an eNodeB. The spectrum proxy 103 stores information about each SAG (including constituent components such as baseband unit(s), NR(s), and transmission point(s)) and identifiers for such constituent components. Such information, e.g., components of a SAG and interconnection of such components, may be provided by an output of an RN design tool or by an RN designer. The identifiers permit the spectrum proxy 103 to determine which components comprise a SAG. Optionally, such identifiers may be the serial numbers of the constituent components. Such information may be manually and/or automatically (e.g., from an existing database) received by the spectrum proxy 103. Thus, when the spectrum proxy 103 receives a communication (e.g., a message) from a component that includes the component's identifier, the spectrum proxy 103 can determine, through an identifier, which component has originated communication. Such communication may take place when a component registers with, sends an inquiry to, or sends a grant request to the spectrum proxy 103. The spectrum proxy will allocate spectrum to each baseband unit (and optionally the NR(s)) of a SAG based upon frequency spectrum allocated by a SAS 104 to each transmission point of the SAG.

Each baseband unit of an RN belonging to a SAG needs to be assigned frequency spectrum that is the same or a subset of frequency spectrum assigned to TP(s) (and optionally rNR(s)) communicatively coupled to the baseband unit. Because baseband units need not register with the SAS, this frequency spectrum assignment function can be performed by the spectrum proxy. Each baseband unit can register with the spectrum proxy 103. Baseband units are entities which need not register with the SAS 104 because the baseband units do not emit signals on a carrier frequency to be emitted by an antenna. The spectrum proxy 103 can recognize a baseband unit by an address, e.g., Internet protocol address or network domain, of the baseband unit or by the baseband unit's identifier, e.g., serial number, which optionally can be pre-provisioned in the spectrum proxy. The address of a baseband unit may be derived from messages (e.g., pertaining to registration, spectrum inquiry, or grant inquiry) sent from and include an identifier of the baseband unit. Thus, the spectrum proxy may (or may not) eliminate communications between baseband unit(s) of a RN and the SAS.

In block 400A, for each transmission point of each SAG of an RN, at least one of: one or more available frequency spectrum and a maximum transmit power level for each of the one or more available frequency spectrum is received, e.g., from a SAS. Optionally, the one or more available frequency spectrum may be received in response to a spectrum inquiry transmitted to a SAS. Optionally, the maximum transmit power level for each of the one or more available frequency spectrum may be received in response to a grant request transmitted to a SAS. Available frequency spectrum means frequency spectrum identified as being available, e.g., by a SAS in response to either a spectrum inquiry or a grant request. An available frequency spectrum may also be referred to as an available frequency channel. Aggregate available frequency spectrum means a sum of the available frequency spectrum received for a transmission point, e.g., from a SAS due to a spectrum inquiry or a grant request. Optionally, one or more available frequency spectrum and a corresponding maximum transmit power level (for each available frequency spectrum) is also received, from a SAS, for NR(s), e.g., registered with the SAS.

Optionally, in block 400B, determine if the maximum transmit power for at least one received frequency spectrum is less than a threshold power level. The threshold power level may be defined by a designer of the spectrum proxy, by the operators' agreement, or otherwise. If the maximum transmit power for at least one received frequency spectrum is less than the threshold power level, then, optionally in block 400C, adjust the aggregate available frequency spectrum by excluding any frequency spectrum (whose maximum transmit power is less than the threshold power level) from the received available frequency spectrum. Then proceed to block 400D. If the maximum transmit power for each received frequency spectrum is not less than a threshold power level, then proceed to block 400D.

In block 400D, for each SAG, based upon the corresponding operators' agreement and the aggregate available frequency spectrum of each TP of a SAG, (a) allocate available frequency spectrum to each transmission point and (b) apportion at least a portion of the allocated available frequency spectrum (apportioned frequency spectrum) to each baseband unit (BBU) of the SAG or each output of each baseband unit of the SAG, and optionally to each NR communicatively connected to the at least one baseband unit or output of the baseband unit; each baseband unit or baseband unit output and communicatively connected NR and each TP electrically connected to the NR belong to a SAG. The allocated available frequency spectrum for each transmission point, electrically connected to the same NR, is the same.

In block 400E, each apportioned frequency spectrum (determined pursuant to block 400D) is sent (or transmit) to each baseband unit of the corresponding SAG. Optionally, the apportioned at least a portion of the allocated available frequency spectrum (translated to baseband) is also sent to NR(s) and/or optional DDC(s) (if used in the RN) of the corresponding SAG. Communication between the spectrum proxy 103 and a NR or an optional DDC may be made through a proprietary protocol or a protocol used by components designed to communicate with the SAS 104 (e.g., a SAS-CBSD protocol used by a NR or an optional DDC that is a CBSD). If input signals to a NR are baseband signals, then the assigned at least a portion of the allocated available frequency spectrum must be communicated to the NR so that it can translate the baseband signals to an appropriate carrier frequency (e.g., in the allocated available frequency spectrum). The assigned at least a portion of the allocated available frequency spectrum is sent to NR(s) and/or optional DDC(s) if one or both is registered to with the SAS 104.

Figure 4B:
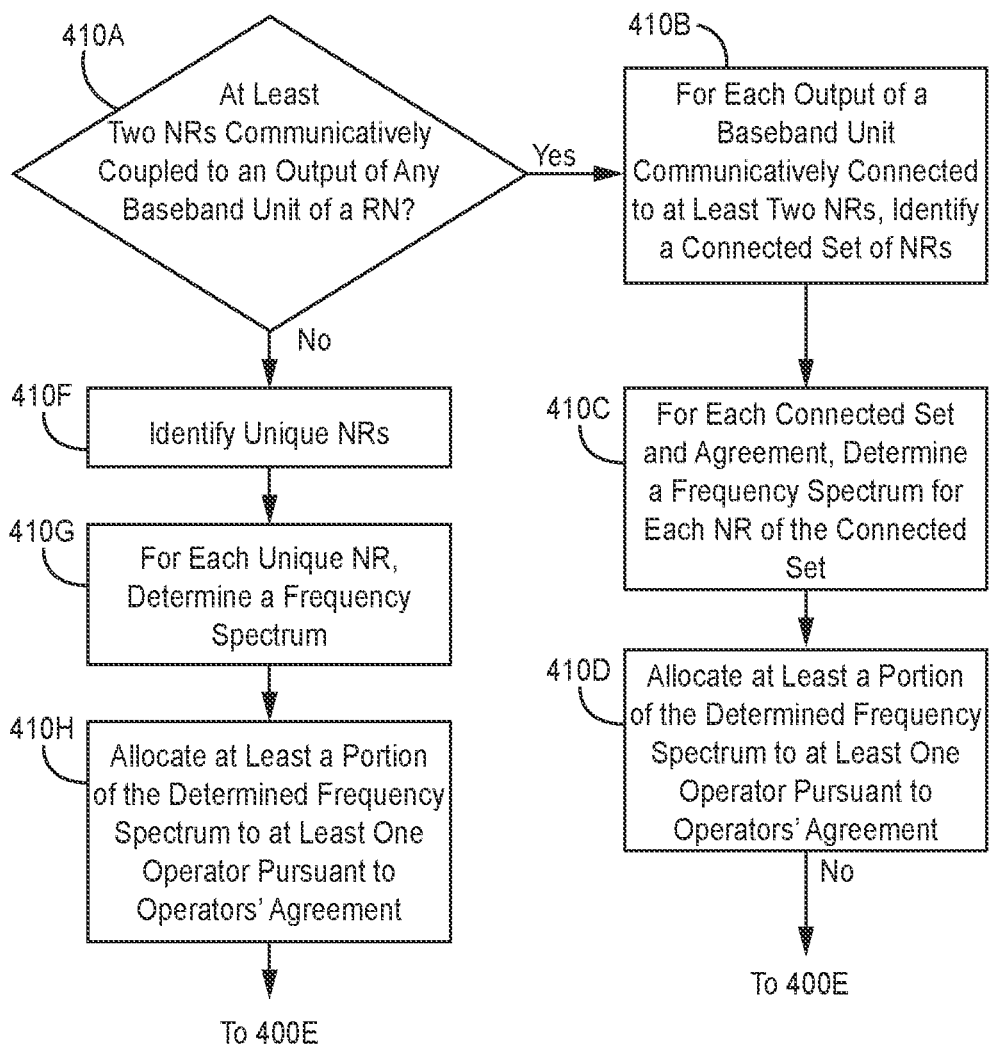
FIG. 4B illustrates a flow diagram of one embodiment of a method of allocating aggregate available frequency spectrum to each transmission point, and apportioning at least a portion of the allocated aggregate available frequency spectrum to at least one baseband unit or at least one baseband unit output.

FIG. 4B illustrates a flow diagram of one embodiment of a method 410 of allocating aggregate available frequency spectrum to each transmission point, and apportioning at least a portion of the allocated aggregate available frequency spectrum to at least one baseband unit or at least one baseband unit output. Thus, FIG. 4B illustrates one embodiment of how to implement block 400D of FIG. 4A.

In block 410A, determine if at least two NR are communicatively connected to an output of any baseband unit of a RN. The connection between such components may be determined from stored SAG information described elsewhere herein. As discussed elsewhere herein, each baseband unit output may have its own unique identifier, e.g., a physical cell identifier or ID.

If at least two NRs are communicatively connected to an output of any baseband unit of a RN, then proceed to block 410B. In block 410B, for each output (of a baseband unit) communicatively connected to at least two NRs, connected set(s) of NR(s) are identified. Each connected set comprises the NR(s) communicatively connected to the same output of a baseband unit. If at least two NRs are not communicatively connected to an output of any baseband unit of a RN, then proceed to block 410F.

In block 410C, for each connected set, determine a frequency spectrum for each NR of the connected set by determining an aggregate available frequency spectrum of a transmission point (connected to the NR) having a minimum bandwidth. The frequency spectrum for the baseband units whose outputs are communicatively coupled to the NRs of the connected set is the frequency spectrum of a NR of the connected set having the maximum bandwidth. If only one transmission point is electrically connected to a NR, then the determined frequency spectrum is the aggregate available frequency spectrum of that transmission point.

In block 410D, allocate at least a portion of the frequency spectrum of each NR determined in block 410C (determined frequency spectrum) to at least one operator pursuant to the operators' agreement. Thus, one or more operators may not utilize all of the bandwidth of the determined frequency spectrum available through a baseband unit, a NR communicatively connected to the NR, and transmission points electrically connected to the NR. This is subsequently illustrated. After block 410D, proceed to block 400E.

Figure 4C:
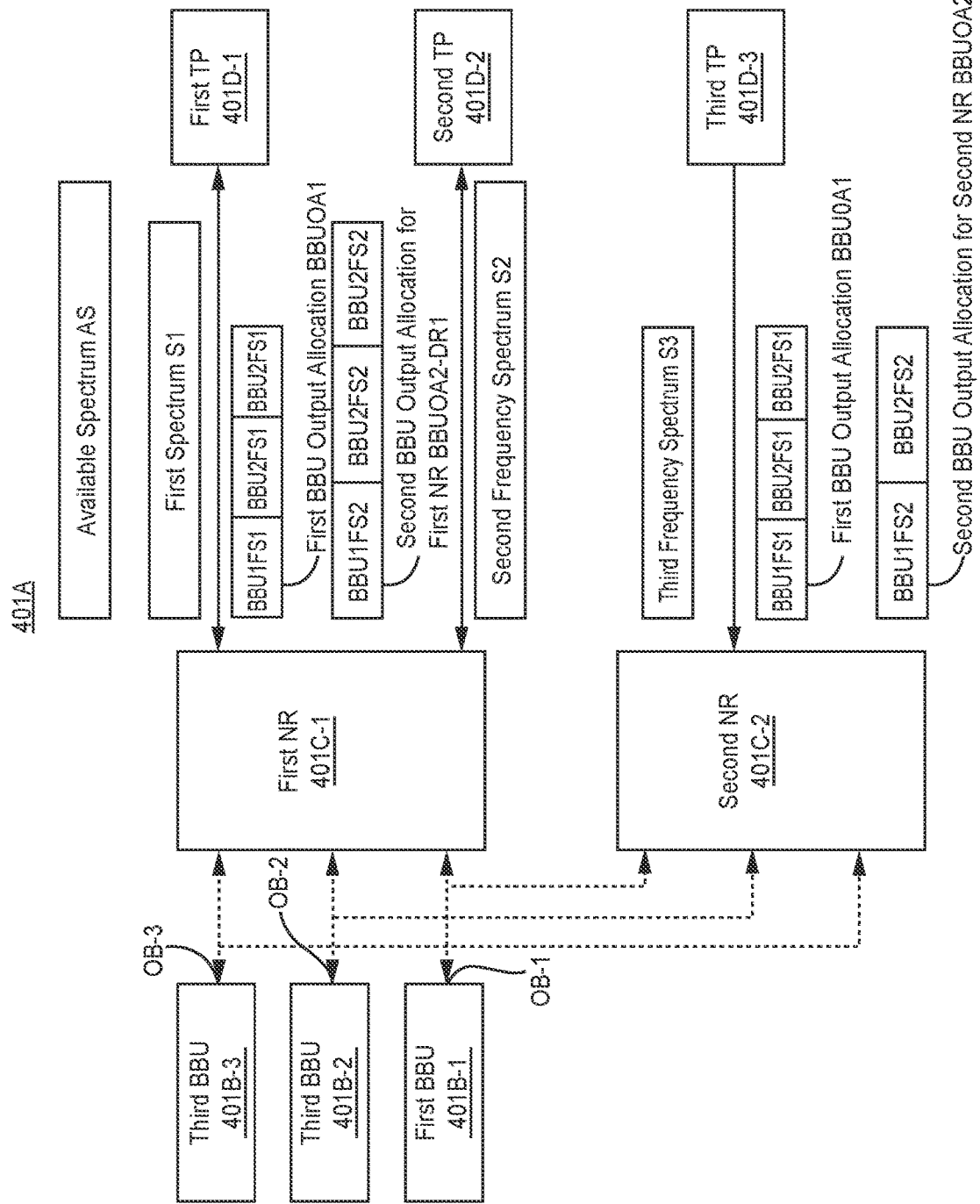
FIG. 4C illustrates a block diagram of one embodiment of a radio network according to embodiments of the invention where an output of each baseband unit is communicatively connected to more than one network radio.

FIG. 4C illustrates a block diagram of one embodiment of a RN 401A according to embodiments of the invention where an output of each baseband unit is communicatively connected to more than one NR. Optionally, the output of each baseband unit may be communicatively coupled to more than one NR when two geographically close, e.g., adjacent, zones of a venue are expected to have a volume of traffic that is less than the bandwidth of the outputs. Thus, NRs (and hence transmission points electrically connected to the NRs) can be communicatively connected to each output.

The illustrated RN 401A comprises a first baseband unit 401B-1, a second baseband unit 401B-2, and a third baseband unit 401B-3. The first baseband unit 401B-1, the second baseband unit 401B-2, and the third baseband unit 401B-3 respectively comprise a first baseband unit output OB-1, a second baseband unit output OB-2, and a third baseband unit output OB-3. Each baseband unit output is associated with a unique operator.

The first baseband unit output OB-1, the second baseband unit output OB-2, and the third baseband unit output OB-3 are respectively communicatively connected to both a first NR 401C-1 and a second NR 401C-2. The first NR 401C-1 and the second NR 401C-2 are respectively electrically connected to the first and second transmission points 401D-1, 401D-2, and the third transmission point 401D-3. The number of baseband units, NRs, and transmission points illustrated are selected for pedagogical purposes only.

The aggregate available frequency spectrum for the first transmission point 401D-1 and the second transmission point 401D-2 are respectively a first frequency spectrum S1 to and a second frequency spectrum S2. The illustrated first frequency spectrum S1 has a bandwidth less than the bandwidth of the second frequency spectrum S2. Optionally, for example, the first frequency spectrum S1 may have less bandwidth than the second frequency spectrum S2 because the first transmission point 401D-1 contributes higher interference to an incumbent or a protection region or point than the interference contributed by the second transmission point 401D-2. Because the first transmission point 401D-1 and the second transmission point 401D-2 utilize the first NR 401C-1, a maximum frequency spectrum determined (for the first NR 401C-1 and the first and second transmission points 401D-1, 401D-2 electrically connected to the first NR 401C-1) is an aggregate available frequency spectrum of the first transmission point 401D-1 which has a minimum bandwidth.

The aggregate available frequency spectrum for the second NR 401C-2 and the third transmission point 401D-3 is a third frequency spectrum S3. The illustrated third frequency spectrum S3 has a bandwidth that is lower than the bandwidths of both of the first frequency spectrum S1 and the second frequency spectrum S2. Because the illustrated second NR 401C-2 is electrically connected to only one transmission point, the third transmission point 401D-3, the frequency spectrum for the third NR 401C-2 and the third transmission point 401D-3 is the third frequency spectrum S3.

A portion of each aggregate available frequency spectrums determined for the first NR 401C-1 and the second NR 401C-2 and their corresponding transmission points is allocated to at least one operator pursuant to the operators' agreement algorithm 103A. Different allocations are possible, and the actual allocation is based upon the operator's agreement which is implemented in the spectrum proxy 103 through the operators' agreement algorithm 103A.

Optionally, if the operators' agreement, and thus the operators' agreement algorithm 103A, requires that three operators (where a unique operator is associated with one of the first baseband unit output OB-1, the second baseband unit output OB-2, and the third baseband unit output OB-3) equally share bandwidth, then the determined aggregate available frequency spectrum (of the first NR 401C-1 and the second NR 401C-2) having the smallest bandwidth is determined and split equally as shown for a first baseband unit (BBU) output allocation BBUOA1 and which utilizes the third frequency spectrum S3. The first baseband unit output allocation BBUOA1 comprises a first frequency band BBU1FS1 for the first baseband unit output OB-1, a second frequency band BBU2FS1 for the second baseband unit output OB-2, and a third frequency band BBU3FS1 for the third baseband unit output OB-3—which optionally have equal bandwidths. The first baseband unit output allocation BBU01A is applicable to both the first and second NRs 401C-1, 401C-2. The third frequency spectrum S3 has a bandwidth smaller than the bandwidth of the first frequency spectrum S1. In this option, all NRs of a connected set utilize the lowest aggregate available frequency spectrum of a NR is utilized by all NRs.

Alternatively, optionally, if the operators' agreement, and thus the operators' agreement algorithm 103A, requires that first and second operators (respectively uniquely associated with each of the first baseband unit output OB-1 and the second baseband unit output OB-2) equally share bandwidth and that the third operator (uniquely associated with the third baseband unit output OB-3) only be assigned bandwidth if a determined aggregate available frequency spectrum exceeds a threshold bandwidth. The threshold bandwidth is defined by the operators' agreement. If the determined aggregate available frequency spectrum exceeds the threshold bandwidth, then the determined aggregate available frequency spectrum for a NR may be allocated (as specified in the operators' agreement and thus in the operators' agreement algorithm 103A) so as to include frequency spectrum allocated to the third baseband unit output OB-3 and thus the third operator. The determined aggregate available frequency spectrum (which is the first spectrum S1) for the first NR 401C-1 (and its associated transmission points) exceeds the threshold bandwidth. Thus, for this alternative option, the second baseband unit output allocation for the first NR BBUOA2-DR1 is a division (e.g., an equal division) of the first spectrum S1 amongst the first baseband unit output OB-1, the second baseband unit output OB-2, and the third baseband unit output OB-3 (and their corresponding operators). The second baseband unit output allocation for the first NR BBUOA2-DR1 comprises an alternative first frequency band BBU1FS2 for the first baseband unit output OB-1, an alternative second frequency band BBU2FS2 for the second baseband unit output OB-2, and an alternative third frequency band BBU3FS2 for the third baseband unit output OB-3. In this example, the first baseband unit output allocation BBU01A is applicable to only the first NR 401C-1.

In this example, the determined aggregate available frequency spectrum for the second NR 401C-2 (e.g., third frequency spectrum S3) has a bandwidth below the threshold bandwidth. Thus, no portion of such determined aggregate available frequency spectrum is allocated to the third baseband unit 401B-3, e.g., the third operator. To remain within the bandwidth of the determined aggregate available frequency spectrum for the second NR 401C-2 (e.g., third frequency spectrum S3), a second baseband unit output allocation for the second NR BBUOA2-DR2 comprises only the first frequency band BBU1FS1 for the first baseband unit output OB-1 and the second frequency band BBU2F S1 for the second baseband unit output OB-2 (which are equivalent to those same frequency bands in the second baseband unit output allocation for the first NR BBUOA2-DR1. In this option, a NR of a connected set with the largest aggregate available frequency spectrum can fully utilize its aggregate available frequency spectrum.

In block 410F, each unique NR is identified, where each unique NR is the only NR communicatively connected an output of a baseband unit. In block 410G, determine a frequency spectrum for each unique NR by determining an aggregate available frequency spectrum of a transmission point (connected to the unique NR) having a minimum bandwidth.

In block 410H, allocate at least a portion of the frequency spectrum of each unique NR determined in block 410C (unique determined frequency spectrum) to at least one operator pursuant to the operators' agreement. Thus, one or more operators may not utilize all of the bandwidth of the unique determined frequency spectrum available through a baseband unit, a NR communicatively connected to the NR, and transmission points electrically connected to the NR. After block 410H, proceed to block 400E. In block 400E, optionally, a corresponding portion allocated in block 410H and/or block 410D is transmitted to each baseband unit.

Figure 4D:
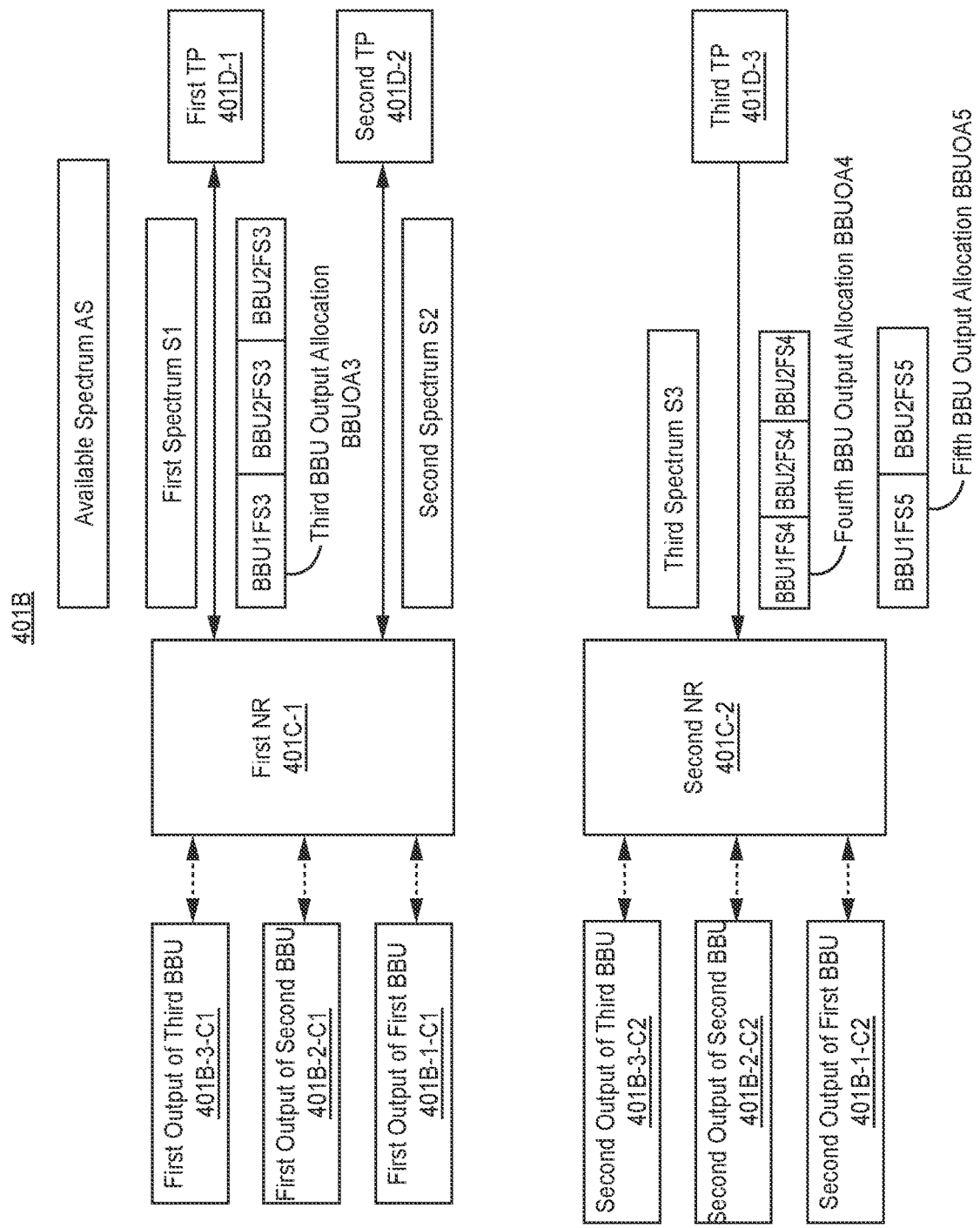
FIG. 4D illustrates a block diagram of one embodiment of a radio network according to embodiments of the invention where an output of each baseband unit is communicatively connected to only one network radio.

FIG. 4D illustrates a block diagram of one embodiment of a RN 401B according to embodiments of the invention where an output of each baseband unit is communicatively connected to only one NR. For pedagogical reasons, FIG. 4D is illustrated with baseband units comprising more than one output; however, alternatively unique baseband units with a single output could be used in the alternative. The illustrated RN 401B comprises first and second outputs of a first baseband unit 401B-1-C1, 401B-1-C2, first and second outputs of a second baseband unit 401B-2-C1, 401B-2-C2, and first and second outputs of a third baseband unit 401B-3-C1, 401B-3-C2. Each baseband unit output is associated with a unique operator.

The first outputs 401B-1-C1, 401B-2-C1, 401B-3-C1 and second outputs 401B-1-C2, 401B-2-C2, 401B-3-C2 are communicatively connected to respectively a first NR 401C-1 and a second NR 401C-2. The first NR 401C-1 and the second NR 401C-2 are respectively electrically connected to the first and second transmission points 401D-1, 401D-2, and the third transmission point 401D-3. The number of baseband units, NRs, and transmission points illustrated are selected for pedagogical purposes only.

The aggregate available frequency spectrum for the first transmission point 401D-1 and the second transmission point 401D-2 are respectively a first frequency spectrum S1 to and a second frequency spectrum S2. The illustrated first frequency spectrum S1 has a bandwidth less than the bandwidth of the second frequency spectrum S2. Because the first transmission point 401D-1 and the second transmission point 401D-2 utilize the first NR 401C-1, the frequency spectrum determined (for the first NR 401C-1 and the first and second transmission points 401D-1, 401D-2 electrically connected to the first NR 401C-1) is an aggregate available frequency spectrum of the first transmission point 401D-1 which has a minimum bandwidth.

The aggregate available frequency spectrum determined for the second NR 401C-2 and the third transmission point 401D-3 is a third frequency spectrum S3. The illustrated third spectrum S3 has a bandwidth that is lower than the bandwidths of both of the first frequency spectrum S1 and the second frequency spectrum S2. Because the illustrated second NR 401C-2 is electrically connected to only one transmission point, the third transmission point 401D-3, the frequency spectrum determined for the third NR 401C-2 and the third transmission point 401D-3 is the third frequency spectrum S3.

A portion of each aggregate available frequency spectrums determined for the first NR 401C-1 and the second NR 401C-2 and their corresponding transmission points is allocated to at least one operator pursuant to the operators' agreement algorithm 103A. Different allocations are possible, and the actual allocation is based upon the operator's agreement which is implemented in the RN through the operators' agreement algorithm 103A.

Optionally, if the operators' agreement, and thus the operators' agreement algorithm 103A, requires that three operators (where a unique operator is associated with each baseband unit) equally share bandwidth, then the determined aggregate available frequency spectrum (of the first NR 401C-1 and the second NR 401C-2) is split equally as shown respectively by a third baseband unit (BBU) output allocation BBUOA3 (which utilizes the first frequency spectrum S1) and a fourth baseband unit (BBU) output allocation BBUOA4 (which utilizes the third frequency spectrum S3). The third baseband unit output allocation BBUOA3 comprises a first frequency band BBU1FS3 for the first output of the first baseband unit 401B-1-C1, a second frequency band BBU2FS3 for the first output of the second baseband unit 401B-2-C1, and a third frequency band BBU3FS3 for the first output of the third baseband unit 401B-3-C1—which optionally have equal bandwidths. In the illustrated embodiment, the third baseband unit output allocation BBUO3A is applicable to only the first NR 401C-1. The fourth baseband unit output allocation BBUOA4 comprises a first frequency band BBU1FS4 for the first output of the first baseband unit 401B-1-C1, a second frequency band BBU2FS4 for the first output of the second baseband unit 401B-2-C1, and a third frequency band BBU3FS4 for the first output of the third baseband unit 401B-3-C1—which optionally have equal bandwidths. In the illustrated embodiment, the fourth baseband unit output allocation BBUO3A is applicable to only the second NR 401C-1.

Alternatively, optionally, if the operators' agreement, and thus the operators' agreement algorithm 103A, requires that first and second operators (respectively uniquely associated with each of the first baseband unit and the second baseband unit) equally share bandwidth and that the third operator (uniquely associated with the third baseband unit output OB-3) only be assigned bandwidth if a determined aggregate available frequency spectrum exceeds a threshold bandwidth. The threshold bandwidth is defined by the operators' agreement. If the determined aggregate available frequency spectrum exceeds the threshold bandwidth, then the determined aggregate available frequency spectrum for a NR may be allocated (as specified in the operators' agreement and thus in the operators' agreement algorithm 103A) so as to include frequency spectrum allocated to the third baseband unit and thus the third operator. The determined aggregate available frequency spectrum (which is the first spectrum S1) for the first NR 401C-1 (and its associated transmission points) exceeds the threshold bandwidth. Thus, the bandwidths associated with the first output of the first baseband unit 401B-1-C1, the first output of the second baseband unit 401B-2-C1, and the first output of the third baseband unit 401B-3-C1, and the first NR 401C-1 are allocated (e.g., equally) to each baseband unit and corresponding operators as described elsewhere herein.

In this example, the determined aggregate available frequency spectrum for the second NR 401C-2 (e.g., third frequency spectrum S3) has a bandwidth below the threshold bandwidth. Thus, no portion of such determined aggregate available frequency spectrum is allocated to the third baseband unit, e.g., the third operator. To remain within the bandwidth of the determined aggregate available frequency spectrum for the second NR 401C-2 (e.g., third frequency spectrum S3), a fifth baseband unit output allocation for the second NR BBUOA5 comprises only the first frequency band BBU1FS5 for the first baseband unit and the second frequency band BBU2FS5 for the second baseband unit, and, e.g., are equal in bandwidth.

Figure 5:
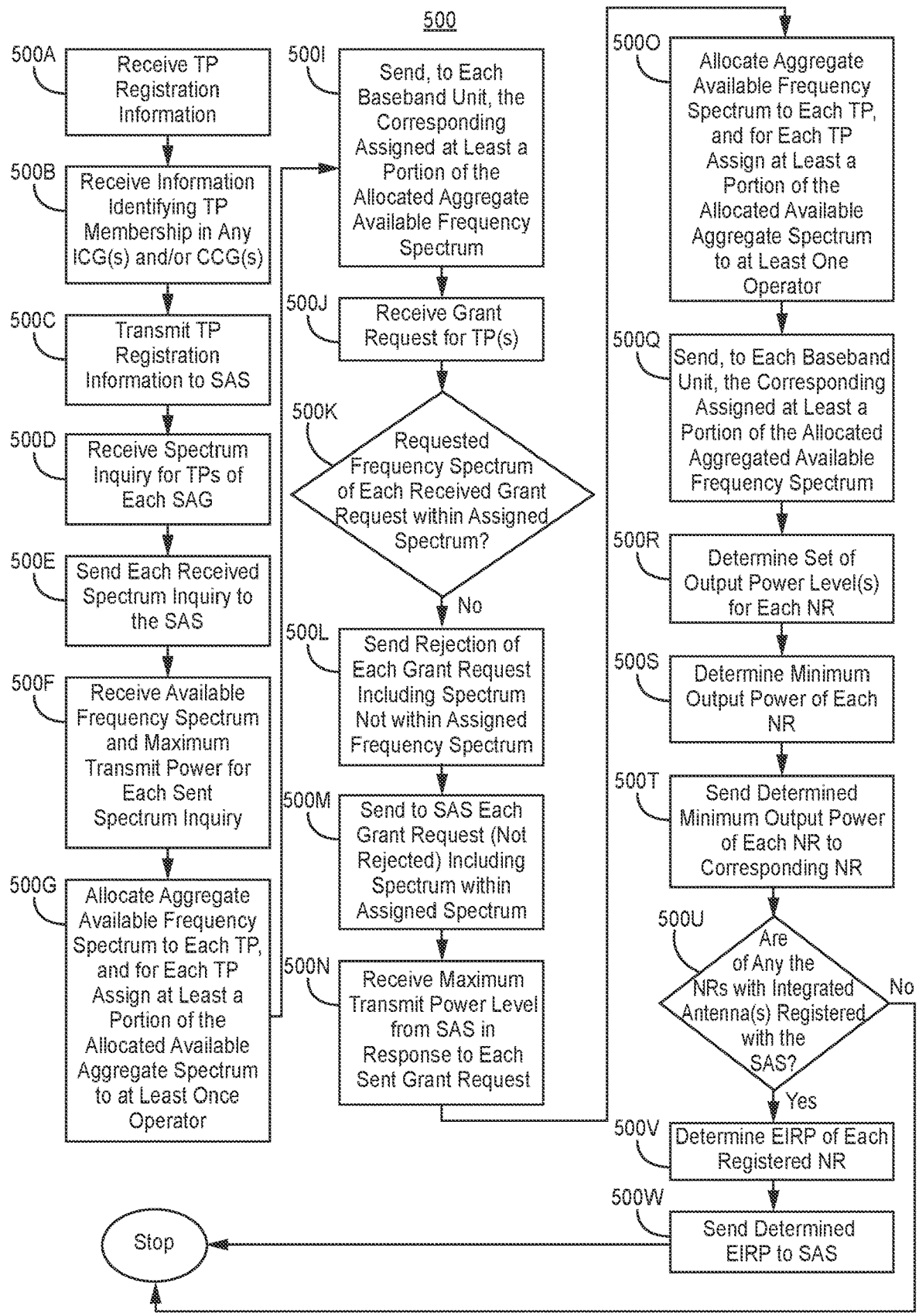
FIG. 5 illustrates a flow diagram of one embodiment of a method of implementing a spectrum proxy in a shared spectrum system.

FIG. 5 illustrates a flow diagram of one embodiment of a method 500 of implementing a spectrum proxy in a shared spectrum system, e.g., a CBRS. Optionally, in block 500A, TP registration information is received for each TP from the optional DDC(s) (if used) and/or the NR(s). Registration information may include antenna geographic location, antenna height, class or maximum transmit power level capability, requested authorization status (priority or general authorized), identification number, call sign, user contact information, air interface technology, unique manufacturers serial number, and/or sensing capabilities (if supported). Optionally, if any NR is a radio, e.g., a CBSD, required to register with the SAS, then NR registration information is also received from the corresponding NR(s).

Block 500N may be optionally implemented by block 400A; block 500O may be optionally implemented by blocks 400B, 400C, and/or block 400D; block 500Q may be optionally implemented by block 400E. Other blocks illustrated in FIG. 5 are each optional.

Optionally, in block 500B, membership of each TP in any ICG and/or CCG is received from the planner. Optionally, in block 500C, transmit registration information, and ICG and CCG membership information, for each TP to the SAS; optionally, if registration information was received for any NR(s), then also transmit registration information for NR(s) to the SAS.

Optionally, in block 500D, a spectrum inquiry is received for each TP of each SAG of the RN from an optional DDC (if used) and/or a NR. Optionally, a spectrum inquiry is received from and for at least one baseband unit of a SAG (e.g., each baseband unit of each SAG) of the RN. Optionally, receive a spectrum inquiry from each NR that has been registered with the SAS. Optionally, one or more frequency spectrum inquiries are received for each TP (and optionally from each NR that has been registered with the SAS), where each of the one or more frequency spectrum inquiries comprises an inquiry for a unique frequency spectrum of a minimum bandwidth for each of which a maximum transmit power level can be assigned by the SAS. Optionally, the minimum bandwidth may be 10 MHz. Optionally, the spectrum inquiry for each TP will inquire about the availability of the maximum potential bandwidth, e.g., which is 150 MHz for CBRS. Thus, optionally, e.g., for CBRS, a spectrum inquiry for a TP may comprise an inquiry for each of fifteen 10 MHz frequency spectrum (or channels).

Optionally, in block 500E, each received spectrum inquiry is sent to the SAS. Optionally, in block 500F, one or more available frequency spectrum of minimum bandwidth and maximum transmit power level (e.g., in EIRP) for each of the available frequency spectrum of minimum bandwidth is identified by and received from the SAS for each TP based upon the one or more spectrum inquiries sent for each TP. In block 500F, each TP (and optionally each NR) belonging to an ICG may be assigned the same frequency spectrum. Optionally, block 500F may be implemented by block 400A described herein.

Optionally, in block 500G, aggregate available frequency spectrum, due to a spectrum inquiry, is allocated to each TP of a SAG, and each TP is assigned at least a portion of the allocated available aggregate spectrum to at least one operator. Optionally, block 500F may be implemented with block 400A. Optionally, block 500G may be implemented by blocks 400B, 400C, and/or 400D described herein; optionally, block 500G may be implemented with the options described with regards to blocks 400B, 400C, and/or 400D. Optionally, block 500I may be implemented with block 400E.

Optionally, in block 500I, each apportioned allocated aggregate frequency spectrum (determined pursuant to block 500G) is sent to a corresponding baseband unit. Optionally, block 500I may be implemented by block 400E described herein; optionally, block 500I may be implemented with the options described with regards to block 400E. In block 500J, a grant request is received, for at least one transmission point of a SAG of the RN, from an optional DDC (if used) and/or a NR. Optionally, a grant request is also received from each baseband unit of a SAG (e.g., every baseband unit of a SAG) of the RN and/or any NR(s) registered with the SAS. The grant request comprises at least one of a requested maximum transmit power level and a requested (transmit)frequency spectrum.

In block 500K, the received requested frequency spectrum in each grant request from each transmission point is evaluated to determine if the received requested frequency spectrum is within the frequency spectrum assigned (or allocated) to a corresponding transmission point. If any transmission point requested a frequency spectrum that is not within the frequency spectrum assigned to the transmission point, then optionally proceed to block 500L. In block 500L, a rejection of a grant request is sent from the SAS proxy to each optional DDC (if used) and/or NR issuing a rejected grant request on behalf of corresponding transmission point. Then proceed to block 500M. In block 500M, send, e.g., transmit, to the SAS each grant request that was not rejected including requested frequency spectrum within assigned frequency spectrum. Optionally, block 500F may be implemented by block 410A described herein For each grant request for a TP where the frequency spectrum is within the allocated frequency spectrum, then in block 500M send, e.g., transmit, to the SAS the grant request. In block 500N, a maximum transmit power (e.g., in EIRP) is received from the SAS in response to a grant request. Alternatively, if the requested frequency spectrum in unavailable at least one alternative frequency spectrum, and a corresponding maximum transmit power, is provided by the SAS in response to a grant request.

In block 500O, an aggregate available frequency spectrum, due to a grant request, is allocated to each TP of a SAG, and each TP is assigned at least a portion of the allocated available aggregate spectrum to at least one operator. Optionally, block 500O may be implemented by blocks 400B, 400C, and/or 400D described herein; optionally, block 500O may be implemented with the options described with regards to blocks 400B, 400C, and/or 400D.

In block 500Q, each apportioned allocated aggregate frequency spectrum (determined pursuant to block 500O) is sent, e.g., transmitted, to a corresponding baseband unit. Optionally, block 500Q may be implemented by block 400E described herein; optionally, block 500Q may be implemented with the options described with regards to block 400E.

In block 500R, a set of output power levels is determined for each NR. Firstly, the allocated transmit power levels (e.g., in EIRP) for each transmit point connected to a corresponding NR is determined. Then, (a) a loss, e.g., due to cable power dissipation, between each transmission point and the NR and (b) antenna gain, e.g., antenna gain at bore sight of antenna pattern, of a corresponding TP are subtracted from the corresponding transmission point's maximum transmit power level.

In block 500S, a minimum output power level of the set for each NR is determined. In block 500T, the determined minimum output power level of each NR is sent, e.g., transmitted, to the corresponding NR.

Optionally, in block 500U, whether any NR(s) with integrated antenna(s) have registered with the SAS is determined. An NR with an integrated antenna(s) means an NR that is not electrically connected to TP(s) but where the NR includes one or more antennas. If any NR(s) with integrated antenna(s) have been registered with the SAS, then, in optional block 500V, then the minimum output transmit power level (e.g., in EIRP) of each registered NR is adjusted by adding an antenna gain of each registered NR to the determined minimum output power, e.g., in EIRP, of the corresponding registered NR. The antenna gain is the same antenna gain registered by the NR with the SAS. Then, optionally in block 500W, the adjusted minimum transmit power level of each registered NR is sent to the SAS. Optionally, then stop. If no NR(s) have been registered, then optionally stop.

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files. Although separate databases are recited herein, one or more of such databases may be combined.

EXEMPLARY EMBODIMENTS

Example 1 includes a program product comprising a non-transitory processor readable medium on which program instructions are embodied, wherein the program instructions are configured, when executed by at least one programmable processor, to cause the at least one programmable processor to: receive initial data about each transmission point, of a radio network (RN), whose transmissions in frequency spectrum shared with at least one incumbent are controlled by a spectrum access system (SAS), wherein the initial data comprises a frequency spectrum bandwidth and a transmit power level for each transmission point, wherein each transmission point has an antenna pattern encompassing all or part of a venue, wherein the RN comprises at least one network radio, wherein each network radio is communicatively coupled to at least one transmission point, and wherein the RN is configured to communicate, through a transmission point communicatively coupled to a network radio, with user equipment in the venue; receive data about at least one of: (a) the at least one incumbent, which has priority to receive in the shared frequency spectrum over the at least one transmission point, and (b) at least one region to be maintained free of interference in the shared frequency spectrum; receive data about at least one external radio whose transmissions are in the shared frequency spectrum shared and is controlled by the SAS, wherein each external radio is located external to the venue; generate at least one transmission point neighborhood, wherein each transmission point neighborhood is generated around a geographic location of a unique transmission point or a geographic center of the venue; using at least a portion of the data about at least one of: (a) the at least one incumbent and (b) the at least one region, identify each protection point, representing an incumbent or a region, in each transmission point neighborhood; generate a protection point neighborhood around a geographic location of each protection point identified in a transmission point neighborhood; identify each transmission point in each protection point neighborhood; create an interference coexistence group comprising all transmission points; create a unique channel coexistence group for each set of at least one transmission point connected to a unique network radio of the RN; determine a maximum transmit power level and a frequency spectrum of each transmission point of the RN when an aggregate interference, in the shared frequency spectrum, at each identified protection point does not exceed an interference threshold level of a corresponding protection point, wherein the aggregate interference is from each transmission point identified in a protection point neighborhood around the corresponding protection point; determine, for each transmission point of the RN, if a bandwidth of the determined frequency spectrum is greater than or equal to a frequency spectrum bandwidth of a corresponding transmission point in the initial data and if the determined maximum transmit power level is greater than or equal to respectively a maximum transmit power level of the corresponding transmission point in the initial data; upon determining that both conditions are not met for each transmission point, then identify each transmission point for which both conditions are not met;

and receive new transmission point data for each transmission point for which the both conditions are not met or create at least one new interference coexistence group each of which comprises at least one transmission point of the RN, wherein each transmission point that is a member of an interference coexistence group comprising at least two transmission points that can share same frequency spectrum for transmission.

Example 2 includes the program product of Example 1, wherein the RN comprises a distributed antenna system (DAS) or a system of at least one cellular radio, and wherein each network radio comprises a DAS radio if the RN is the DAS, or a cellular radio if the RN comprises the system of at least one cellular radio.

Example 3 includes the program product of any of Examples 1-2, wherein the program instructions are configured, when executed by the at least one programmable processor, to further cause the at least one programmable processor to: cause an interference coexistence group and a channel coexistence group assigned to each transmission point of the RN to be transmitted to at least one of a spectrum proxy and the spectrum access system.

Example 4 includes the program product of any of Examples 1-3, wherein the program instructions are configured, when executed by the at least one programmable processor, to further cause the at least one programmable processor to identify at least one external radio in an incumbent neighborhood; wherein determine the maximum transmit power level and the frequency spectrum of each transmission point of the RN comprises determine a maximum transmit power level and a frequency spectrum of each transmission point of the RN when an aggregate interference, in the shared frequency spectrum, at each identified protection point does not exceed an interference threshold level of a corresponding protection point, wherein the aggregate interference is from each transmission point, of the RN, and each external radio identified in a protection point neighborhood around the corresponding protection point.

Example 5 includes the program product of any of Examples 1-4, wherein determining the maximum transmit power level and the frequency spectrum of each transmission point of the RN comprises: create a network graph comprising at least one node, wherein a node comprises each transmission point of the RN; determine an interference network graph for transmission points of the RN, wherein the interference network graph comprises at least two nodes, including the at least one node, and at least one interference edge connecting two nodes; determine a chromatic number and a color assignment for each node of the interference network graph; determine combinations or permutations of color to specific frequency spectrum mappings for a number of frequency spectrum, n, which can be assigned to the transmission points of the RN; for each specific frequency spectrum mapping of the determined combinations or permutations of specific frequency channel mappings that can be assigned to each node of external radios and to each transmission point, determine a maximum transmit power level for each external radio and for each transmission point of each node so that an aggregate interference level, at each protection point in each of the at least one transmission point neighborhood, does not exceed the interference threshold level of a corresponding protection point; and using a cost function, determine an assignment of specific frequency spectrum for each transmission point of each node that results in at least one of: (a) an enhanced transmit power-bandwidth product or respectively an enhanced probable transmit power-bandwidth product for all transmission points, (b) diminished interference between radios of different network operators, and (c) diminishing changes to specific frequency spectrum either requested by or previously assigned to TPs.

Example 6 includes the program product of Example 5, wherein another node of the network graph comprises at least one external radio.

Example 7 includes a method, comprising: receiving initial data about each transmission point, of a radio network (RN), whose transmissions in frequency spectrum shared with at least one incumbent are controlled by a spectrum access system (SAS), wherein the initial data comprises a frequency spectrum bandwidth and a transmit power level for each transmission point, wherein each transmission point has an antenna pattern encompassing all or part of a venue, wherein the RN comprises at least one network radio, wherein each network radio is communicatively coupled to at least one transmission point, and wherein the RN is configured to communicate, through a transmission point communicatively coupled to a network radio, with user equipment in the venue; receiving data about at least one of: (a) the at least one incumbent, which has priority to receive in the shared frequency spectrum over the at least one transmission point, and (b) at least one region to be maintained free of interference in the shared frequency spectrum; receiving data about at least one external radio whose transmissions are in the shared frequency spectrum shared and is controlled by the SAS, wherein each external radio is located external to the venue; generating at least one transmission point neighborhood, wherein each transmission point neighborhood is generated around a geographic location of a unique transmission point or a geographic center of the venue; using at least a portion of the data about at least one of: (a) the at least one incumbent and (b) the at least one region, identifying each protection point, representing an incumbent or a region, in each transmission point neighborhood; generating a protection point neighborhood around a geographic location of each protection point identified in a transmission point neighborhood; identifying each transmission point in each protection point neighborhood; creating an interference coexistence group comprising all transmission points; creating a unique channel coexistence group for each set of at least one transmission point connected to a unique network radio of the RN; determining a maximum transmit power level and a frequency spectrum of each transmission point of the RN when an aggregate interference, in the shared frequency spectrum, at each identified protection point does not exceed an interference threshold level of a corresponding protection point, wherein the aggregate interference is from each transmission point identified in a protection point neighborhood around the corresponding protection point; determining, for each transmission point of the RN, if a bandwidth of the determined frequency spectrum is greater than or equal to a frequency spectrum bandwidth of a corresponding transmission point in the initial data and if the determined maximum transmit power level is greater than or equal to respectively a maximum transmit power level of the corresponding transmission point in the initial data; upon determining that both conditions are not met for each transmission point, then identifying each transmission point for which both conditions are not met; and receiving new transmission point data for each transmission point for which the both conditions are not met or create at least one new interference coexistence group each of which comprises at least one transmission point of the RN, wherein each transmission point that is a member of an interference coexistence group comprising at least two transmission points that can share same frequency spectrum for transmission.

Example 8 includes the method of Example 7, wherein the RN comprises a distributed antenna system (DAS) or a system of at least one cellular radio, and wherein each network radio comprises a DAS radio if the RN is the DAS, or a cellular radio if the RN comprises the system of at least one cellular radio.

Example 9 includes the method of any of Examples 7-8, further comprising transmitting an interference coexistence group and a channel coexistence group assigned to each transmission point of the RN to at least one of a spectrum proxy and the spectrum access system.

Example 10 includes the method of any of Examples 7-9, further comprising identifying at least one external radio in an incumbent neighborhood; wherein determine the maximum transmit power level and the frequency spectrum of each transmission point of the RN comprises determine a maximum transmit power level and a frequency spectrum of each transmission point of the RN when an aggregate interference, in the shared frequency spectrum, at each identified protection point does not exceed an interference threshold level of a corresponding protection point, wherein the aggregate interference is from each transmission point, of the RN, and each external radio identified in a protection point neighborhood around the corresponding protection point.

Example 11 includes the method of any of Examples 7-10, wherein determining the maximum transmit power level and the frequency spectrum of each transmission point of the RN comprises: creating a network graph comprising at least one node, wherein a node comprises each transmission point of the RN; determining an interference network graph for transmission points of the RN, wherein the interference network graph comprises at least two nodes, including the at least one node, and at least one interference edge connecting two nodes; determining a chromatic number and a color assignment for each node of the interference network graph; determining combinations or permutations of color to specific frequency spectrum mappings for a number of frequency spectrum, n, which can be assigned to the transmission points of the RN; for each specific frequency spectrum mapping of the determined combinations or permutations of specific frequency channel mappings that can be assigned to each node of external radios and to each transmission point, determining a maximum transmit power level for each external radio and for each transmission point of each node so that an aggregate interference level, at each protection point in each of the at least one transmission point neighborhood, does not exceed the interference threshold level of a corresponding protection point; and using a cost function, determining an assignment of specific frequency spectrum for each transmission point of each node that results in at least one of: (a) an enhanced transmit power-bandwidth product or respectively an enhanced probable transmit power-bandwidth product for all transmission points, (b) diminished interference between radios of different network operators, and (c) diminishing changes to specific frequency spectrum either requested by or previously assigned to TPs.

Example 12 includes the method of Example 11, wherein another node of the network graph comprises at least one external radio.

Example 13 includes an apparatus, comprising processing circuitry configured to: receive initial data about each transmission point, of a radio network (RN), whose transmissions in frequency spectrum shared with at least one incumbent are controlled by a spectrum access system (SAS), wherein the initial data comprises a frequency spectrum bandwidth and a transmit power level for each transmission point, wherein each transmission point has an antenna pattern encompassing all or part of a venue, wherein the RN comprises at least one network radio, wherein each network radio is communicatively coupled to at least one transmission point, and wherein the RN is configured to communicate, through a transmission point communicatively coupled to a network radio, with user equipment in the venue; receive data about at least one of: (a) the at least one incumbent, which has priority to receive in the shared frequency spectrum over the at least one transmission point, and (b) at least one region to be maintained free of interference in the shared frequency spectrum; receive data about at least one external radio whose transmissions are in the shared frequency spectrum shared and is controlled by the SAS, wherein each external radio is located external to the venue; generate at least one transmission point neighborhood, wherein each transmission point neighborhood is generated around a geographic location of a unique transmission point or a geographic center of the venue; using at least a portion of the data about at least one of: (a) the at least one incumbent and (b) the at least one region, identify each protection point, representing an incumbent or a region, in each transmission point neighborhood; generate a protection point neighborhood around a geographic location of each protection point identified in a transmission point neighborhood; identify each transmission point in each protection point neighborhood; create an interference coexistence group comprising all transmission points; create a unique channel coexistence group for each set of at least one transmission point connected to a unique network radio of the RN; determine a maximum transmit power level and a frequency spectrum of each transmission point of the RN when an aggregate interference, in the shared frequency spectrum, at each identified protection point does not exceed an interference threshold level of a corresponding protection point, wherein the aggregate interference is from each transmission point identified in a protection point neighborhood around the corresponding protection point; determine, for each transmission point of the RN, if a bandwidth of the determined frequency spectrum is greater than or equal to a frequency spectrum bandwidth of a corresponding transmission point in the initial data and if the determined maximum transmit power level is greater than or equal to respectively a maximum transmit power level of the corresponding transmission point in the initial data; upon determining that both conditions are not met for each transmission point, then identify each transmission point for which both conditions are not met; and receive new transmission point data for each transmission point for which the both conditions are not met or create at least one new interference coexistence group each of which comprises at least one transmission point of the RN, wherein each transmission point that is a member of an interference coexistence group comprising at least two transmission points that can share same frequency spectrum for transmission.

Example 14 includes the apparatus of Example 13, wherein the RN comprises a distributed antenna system (DAS) or a system of at least one cellular radio, and wherein each network radio comprises a DAS radio if the RN is the DAS, or a cellular radio if the RN comprises the system of at least one cellular radio.

Example 15 includes the apparatus of any of Examples 13-14, wherein the processing circuitry is further configured to transmit an interference coexistence group and a channel coexistence group assigned to each transmission point of the RN to at least one of a spectrum proxy and the spectrum access system.

Example 16 includes the apparatus of any of Examples 13-15, wherein the processing circuitry is further configured to identify at least one external radio in an incumbent neighborhood; wherein determine the maximum transmit power level and the frequency spectrum of each transmission point of the RN comprises determine a maximum transmit power level and a frequency spectrum of each transmission point of the RN when an aggregate interference, in the shared frequency spectrum, at each identified protection point does not exceed an interference threshold level of a corresponding protection point, wherein the aggregate interference is from each transmission point, of the RN, and each external radio identified in a protection point neighborhood around the corresponding protection point.

Example 17 includes the apparatus of any of Examples 13-16, wherein determining the maximum transmit power level and the frequency spectrum of each transmission point of the RN comprises: create a network graph comprising at least one node, wherein a node comprises each transmission point of the RN; determine an interference network graph for transmission points of the RN, wherein the interference network graph comprises at least two nodes, including the at least one node, and at least one interference edge connecting two nodes; determine a chromatic number and a color assignment for each node of the interference network graph; determine combinations or permutations of color to specific frequency spectrum mappings for a number of frequency spectrum, n, which can be assigned to the transmission points of the RN in each of nodes of the interference network graph; for each specific frequency spectrum mapping of the determined combinations or permutations of specific frequency channel mappings that can be assigned to each node of external radios and to each transmission point, determine a maximum transmit power level for each external radio and for each transmission point of each node so that an aggregate interference level, at each protection point in each of the at least one transmission point neighborhood, does not exceed the interference threshold level of a corresponding protection point; and using a cost function, determine an assignment of specific frequency spectrum for each transmission point of each node that results in at least one of: (a) an enhanced transmit power-bandwidth product or respectively an enhanced probable transmit power-bandwidth product for all transmission points, (b) diminished interference between radios of different network operators, and (c) diminishing changes to specific frequency spectrum either requested by or previously assigned to TPs.

Example 18 includes the apparatus of any of Examples 17-16, wherein another node of the network graph comprises at least one external radio.

Example 19 includes the apparatus of Example 15, further comprising the spectrum proxy.

Example 20 includes the apparatus of Example 19, further comprising the spectrum access system.

Example 21 includes a program product comprising a non-transitory processor readable medium on which program instructions are embodied, wherein the program instructions are configured, when executed by at least one programmable processor, to cause the at least one programmable processor to: for each transmission point of each spectrum allocation group (SAG) of a radio network (RN), receive at least one of: one or more available frequency spectrum and a maximum transmit power level for each of the one or more available frequency spectrum, wherein aggregate available frequency spectrum is a sum of the one or more available frequency spectrum received for a transmission point, wherein a SAG comprises one or more baseband units communicatively connected through one output of each the one or more baseband units to one or more network radios, one or more transmission points each of which is electrically connected to one of the one or more network radios, and the one or more network radios, and wherein the radio network comprises the one or more baseband units, the one or more network radios, and the one or more transmission points; for each SAG, based upon an operators' agreement and the aggregate available frequency spectrum of each transmission point of a SAG, (a) allocate available frequency spectrum to each transmission point and (b) apportion at least a portion of the allocated available frequency spectrum to each baseband unit of the SAG or each output of each baseband unit of the SAG; and for each SAG, cause each apportioned at least a portion of the allocated available frequency spectrum, translated to baseband, to be transmitted to a corresponding baseband unit.

Example 22 includes the program product of Example 21, wherein the RN comprises a distributed antenna system (DAS) or a system of at least one cellular radio, and wherein each network radio comprises a DAS radio if the RN is the DAS or a cellular radio if the RN comprises the system of at least cellular.

Example 23 includes the program product of any of Examples 21-22, wherein the program instructions are further configured, when executed by the at least one programmable processor, to cause the at least one programmable processor to cause, for each SAG, each apportioned at least a portion of the allocated available frequency spectrum to be transmitted to at least one of: a corresponding at least one network radio and a corresponding data distribution system.

Example 24 includes the program product of Example 23, wherein each output is communicatively connected through a data distribution system to the one or more network radios.

Example 25 includes the program product of any of Examples 21-24, wherein the program instructions are further configured, when executed by the at least one programmable processor, to cause the at least one programmable processor to: determine if the maximum transmit power for at least one of the received one or more available frequency spectrum is less than a threshold power level; and if the maximum transmit power for at least one of the received one or more frequency spectrum is less than the threshold power level, then adjust the aggregate available frequency spectrum by excluding any frequency spectrum, whose maximum transmit power is less than the threshold power level, from the received one or more available frequency spectrum.

Example 26 includes the program product of any of Examples 21-25, wherein (a) allocating the available frequency spectrum to each transmission point and (b) apportioning the at least a portion of the allocated available frequency spectrum to each baseband unit of the SAG or each output of each baseband unit of the SAG comprises: determine if at least two network radios are communicatively connected to an output of any baseband unit of the RN; and if at least two network radios are communicatively connected to the output of any baseband unit of the RN, then: for each output of a baseband unit communicatively connected to at least two network radios, identify at least one connected set of network radios, wherein each connected set comprises at least one network radio communicatively connected to a same output of a baseband unit; for each connected set, determine a frequency spectrum for each network radio of a connected set by determining an aggregate available frequency spectrum of a transmission point, connected to a network radio, having a minimum bandwidth; allocate at least a portion of the determined frequency spectrum of each network radio to at least one operator pursuant to the operators' agreement; and if at least two network radios are not communicatively connected to the output of any baseband unit of the RN, then: identify each unique network radio, where each unique network radio is an only network communicatively connected an output of a baseband unit; determine a frequency spectrum for each unique network radio by determining an aggregate available frequency spectrum of a transmission point, connected to a unique network radio, having a minimum bandwidth; and allocate at least a portion of the determined frequency spectrum of each unique network radio to the at least one operator pursuant to the operators' agreement.

Example 27 includes the program product of any of Examples 21-26, wherein the at least one of: one or more available frequency spectrum and the corresponding maximum transmit power for each available frequency spectrum received for each transmission point of each SAG are provided by a spectrum access system (SAS) in response to a spectrum inquiry transmitted to the SAS or a grant request transmitted to the SAS.

Example 28 includes the program product of any of Examples 21-27, wherein the program instructions are further configured, when executed by at least one programmable processor, to cause the at least one programmable processor to: receive a grant request for at least one transmission point with a requested frequency spectrum; for each transmission point, determine if the requested frequency spectrum in the grant request is within the available frequency spectrum allocated to a corresponding transmission point; for each grant request comprising the requested frequency spectrum within the available frequency spectrum allocated to the corresponding transmission point, cause each such grant request to be transmitted to a spectrum access system (SAS); wherein receive the at least one of: one or more available frequency spectrum and the maximum transmit power level for each of the one or more available frequency spectrum comprises receive a maximum transmit power level in response to the grant request for the requested frequency spectrum or an alternative frequency spectrum and a corresponding maximum transmit power level; determine a set of output power levels output from each network radio, wherein each output power level of the set for each radio is a maximum transmit power level provided at an output of a corresponding network radio less any loss between the corresponding network radio and a unique transmission point connected to the corresponding network radio and an antenna gain of the unique transmission point; determine a minimum output power level of the set of output power levels for each network radio; and for each network radio, cause the minimum output power level to be transmitted to the corresponding network radio.

Example 29 includes the program product of any of Examples 21-28, wherein the program instructions are further configured, when executed by the at least one programmable processor, to cause the at least one programmable processor to: determine whether any network radio with an integrated antenna of the RN is registered with a spectrum access system (SAS); and if at least one network radio with an integrated antenna is registered with the SAS, then adjust a minimum output power level, of each network radio with an integrate antenna registered with the SAS, by adding a corresponding antenna gain, registered with the SAS, for a corresponding network radio with an integrated antenna.

Example 30 includes the program product of Example 29, wherein the program instructions are further configured, when executed by at least one programmable processor, to cause the at least one programmable processor to transmit each adjusted minimum output power level to the SAS.

Example 31 includes a method, comprising: for each transmission point of each spectrum allocation group (SAG) of a radio network (RN), receiving at least one of: one or more available frequency spectrum and a maximum transmit power level for each of the one or more available frequency spectrum, wherein aggregate available frequency spectrum is a sum of the one or more available frequency spectrum received for a transmission point, wherein a SAG comprises one or more baseband units communicatively connected through one output of each the one or more baseband units to one or more network radios, one or more transmission points each of which is electrically connected to one of the one or more network radios, and the one or more network radios, and wherein the radio network comprises the one or more baseband units, the one or more network radios, and the one or more transmission points; for each SAG, based upon an operators' agreement and the aggregate available frequency spectrum of each transmission point of a SAG, (a) allocating available frequency spectrum to each transmission point and (b) apportioning at least a portion of the allocated available frequency spectrum to each baseband unit of the SAG or each output of each baseband unit of the SAG; and for each SAG, transmitting each apportioned at least a portion of the allocated available frequency spectrum, translated to baseband, to a corresponding baseband unit.

Example 32 includes the method of Example 31, wherein the RN comprises a distributed antenna system (DAS) or a system of at least one cellular radio, and wherein each network radio comprises a DAS radio if the RN is the DAS or a cellular radio if the RN comprises the system of at least cellular.

Example 33 includes the method of any of Example 31-32, further comprising transmitting, for each SAG, each apportioned at least a portion of the allocated available frequency spectrum to at least one of: a corresponding at least one network radio and a corresponding data distribution system.

Example 34 includes the method of Example 33, wherein each output is communicatively connected through a data distribution system to the one or more network radios.

Example 35 includes the method of any of Examples 31-34, further comprising: determining if the maximum transmit power for at least one of the received one or more available frequency spectrum is less than a threshold power level; and if the maximum transmit power for at least one of the received one or more frequency spectrum is less than the threshold power level, then adjusting the aggregate available frequency spectrum by excluding any frequency spectrum, whose maximum transmit power is less than the threshold power level, from the received one or more available frequency spectrum.

Example 36 includes the method of any of Examples 31-35, wherein (a) allocating the available frequency spectrum to each transmission point and (b) apportioning the at least a portion of the allocated available frequency spectrum to each baseband unit of the SAG or each output of each baseband unit of the SAG comprises: determining if at least two network radios are communicatively connected to an output of any baseband unit of the RN; and if at least two network radios are communicatively connected to the output of any baseband unit of the RN, then: for each output of a baseband unit communicatively connected to at least two network radios, identifying at least one connected set of network radios, wherein each connected set comprises at least one network radio communicatively connected to a same output of a baseband unit; for each connected set, determining a frequency spectrum for each network radio of a connected set by determining an aggregate available frequency spectrum of a transmission point, connected to a network radio, having a minimum bandwidth; allocating at least a portion of the determined frequency spectrum of each network radio to at least one operator pursuant to the operators' agreement; and if at least two network radios are not communicatively connected to the output of any baseband unit of the RN, then: identifying each unique network radio, where each unique network radio is an only network communicatively connected an output of a baseband unit; determining a frequency spectrum for each unique network radio by determining an aggregate available frequency spectrum of a transmission point, connected to a unique network radio, having a minimum bandwidth; and allocating at least a portion of the determined frequency spectrum of each unique network radio to the at least one operator pursuant to the operators' agreement.

Example 37 includes the method of any of Examples 31-36, wherein the at least one of: one or more available frequency spectrum and the corresponding maximum transmit power for each available frequency spectrum received for each transmission point of each SAG are provided by a spectrum access system (SAS) in response to a spectrum inquiry transmitted to a spectrum access system (SAS) a spectrum access system (SAS) or a grant request transmitted to the SAS.

Example 38 includes the method of any of Examples 31-37, further comprising: receiving a grant request for at least one transmission point with a requested frequency spectrum; for each transmission point, determining if the requested frequency spectrum in the grant request is within the available frequency spectrum allocated to a corresponding transmission point; for each grant request comprising the requested frequency spectrum within the available frequency spectrum allocated to the corresponding transmission point, transmitting each such grant request to a spectrum access system (SAS); wherein receiving the at least one of: one or more available frequency spectrum and the maximum transmit power level for each of the one or more available frequency spectrum comprises receiving a maximum transmit power level in response to the grant request for the requested frequency spectrum or an alternative frequency spectrum and a corresponding maximum transmit power level; determining a set of output power levels output from each network radio, wherein each output power level of the set for each radio is a maximum transmit power level provided at an output of a corresponding network radio less any loss between the corresponding network radio and a unique transmission point connected to the corresponding network radio and an antenna gain of the unique transmission point; determining a minimum output power level of the set of output power levels for each network radio; and for each network radio, transmitting the minimum output power level to the corresponding network radio.

Example 39 includes the method of any of Examples 31-38, further comprising: determining whether any network radio with an integrated antenna of the RN is registered with a spectrum access system (SAS); and if at least one network radio with an integrated antenna is registered with the SAS, then adjusting a minimum output power level, of each network radio with an integrate antenna registered with the SAS, by adding a corresponding antenna gain, registered with the SAS, for a corresponding network radio with an integrated antenna.

Example 40 includes the method of Example 39, further comprising transmitting each adjusted minimum output power level to the SAS.

Example 41 includes an apparatus, comprising processing circuitry configured to: for each transmission point of each spectrum allocation group (SAG) of a radio network (RN), receive at least one of: one or more available frequency spectrum and a maximum transmit power level for each of the one or more available frequency spectrum, wherein aggregate available frequency spectrum is a sum of the one or more available frequency spectrum received for a transmission point, wherein a SAG comprises one or more baseband units communicatively connected through one output of each the one or more baseband units to one or more network radios, one or more transmission points each of which is electrically connected to one of the one or more network radios, and the one or more network radios, and wherein the radio network comprises the one or more baseband units, the one or more network radios, and the one or more transmission points; for each SAG, based upon an operators' agreement and the aggregate available frequency spectrum of each transmission point of a SAG, (a) allocate available frequency spectrum to each transmission point and (b) apportion at least a portion of the allocated available frequency spectrum to each baseband unit of the SAG or each output of each baseband unit of the SAG; and for each SAG, cause each apportioned at least a portion of the allocated available frequency spectrum, translated to baseband, to be transmitted to a corresponding baseband unit.

Example 42 includes the apparatus of Example 41, wherein the RN comprises a distributed antenna system (DAS) or a system of at least one cellular radio, and wherein each network radio comprises a DAS radio if the RN is the DAS or a cellular radio if the RN comprises the system of at least cellular.

Example 43 includes the apparatus of any of Examples 41-42, wherein the processing circuitry is further configured to cause, for each SAG, each apportioned at least a portion of the allocated available frequency spectrum to be transmitted to at least one of: a corresponding at least one network radio and a corresponding data distribution system.

Example 44 includes the apparatus of Example 43, wherein each output is communicatively connected through a data distribution system to the one or more network radios.

Example 45 includes the apparatus of any of Examples 41-44, wherein the processing circuitry is further configured to: determine if the maximum transmit power for at least one of the received one or more available frequency spectrum is less than a threshold power level; and if the maximum transmit power for at least one of the received one or more frequency spectrum is less than the threshold power level, then adjust the aggregate available frequency spectrum by excluding any frequency spectrum, whose maximum transmit power is less than the threshold power level, from the received one or more available frequency spectrum.

Example 46 includes the apparatus of any of Examples 41-45, wherein (a) allocate the available frequency spectrum to each transmission point and (b) apportion the at least a portion of the allocated available frequency spectrum to each baseband unit of the SAG or each output of each baseband unit of the SAG comprises: determine if at least two network radios are communicatively connected to an output of any baseband unit of the RN; and if at least two network radios are communicatively connected to the output of any baseband unit of the RN, then: for each output of a baseband unit communicatively connected to at least two network radios, identify at least one connected set of network radios, wherein each connected set comprises at least one network radio communicatively connected to a same output of a baseband unit; for each connected set, determine a frequency spectrum for each network radio of a connected set by determining an aggregate available frequency spectrum of a transmission point, connected to a network radio, having a minimum bandwidth; allocate at least a portion of the determined frequency spectrum of each network radio to at least one operator pursuant to the operators' agreement; and if at least two network radios are not communicatively connected to the output of any baseband unit of the RN, then: identify each unique network radio, where each unique network radio is an only network communicatively connected an output of a baseband unit; determine a frequency spectrum for each unique network radio by determining an aggregate available frequency spectrum of a transmission point, connected to a unique network radio, having a minimum bandwidth; and allocate at least a portion of the determined frequency spectrum of each unique network radio to the at least one operator pursuant to the operators' agreement.

Example 47 includes the apparatus of any of Examples 41-46, wherein the at least one of: one or more available frequency spectrum and the corresponding maximum transmit power for each available frequency spectrum received for each transmission point of each SAG are provided by a spectrum access system (SAS) in response to a spectrum inquiry transmitted to a spectrum access system (SAS) or a grant request transmitted to the SAS.

Example 48 includes the apparatus of any of Examples 41-47, wherein the processing circuitry is further configured to: receive a grant request for at least one transmission point with a requested frequency spectrum; for each transmission point, determine if the requested frequency spectrum in the grant request is within the available frequency spectrum allocated to a corresponding transmission point; for each grant request comprising the requested frequency spectrum within the available frequency spectrum allocated to the corresponding transmission point, cause each such grant request to be transmitted to a spectrum access system (SAS); wherein receive the at least one of: one or more available frequency spectrum and the maximum transmit power level for each of the one or more available frequency spectrum comprises receive a maximum transmit power level in response to the grant request for the requested frequency spectrum or an alternative frequency spectrum and a corresponding maximum transmit power level; determine a set of output power levels output from each network radio, wherein each output power level of the set for each radio is a maximum transmit power level provided at an output of a corresponding network radio less any loss between the corresponding network radio and a unique transmission point connected to the corresponding network radio and an antenna gain of the unique transmission point; determine a minimum output power level of the set of output power levels for each network radio; and for each network radio, cause the minimum output power level to be transmitted the corresponding network radio.

Example 49 includes the apparatus of any of Examples 41-48, wherein the processing circuitry is further configured to: determine whether any network radio with an integrated antenna of the RN is registered with a spectrum access system (SAS); and if at least one network radio with an integrated antenna is registered with the SAS, then adjust a minimum output power level, of each network radio with an integrate antenna registered with the SAS, by adding a corresponding antenna gain, registered with the SAS, for a corresponding network radio with an integrated antenna.

Example 50 includes the apparatus of Example 49, wherein the processing circuitry is further configured to cause transmission of each adjusted minimum output power level to the SAS.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A program product comprising a non-transitory processor readable medium on which program instructions are embodied, wherein the program instructions are configured, when executed by at least one programmable processor, to cause the at least one programmable processor to:
for each transmission point of each spectrum allocation group (SAG) of a radio network (RN), receive at least one of: one or more available frequency spectrum and a maximum transmit power level for each of the one or more available frequency spectrum, wherein aggregate available frequency spectrum is a sum of the one or more available frequency spectrum received for a transmission point, wherein a SAG comprises one or more baseband units communicatively connected through one output of each the one or more baseband units to one or more network radios, one or more transmission points each of which is electrically connected to one of the one or more network radios, and the one or more network radios, and wherein the radio network comprises the one or more baseband units, the one or more network radios, and the one or more transmission points;
for each SAG, based upon an operators' agreement and the aggregate available frequency spectrum of each transmission point of a SAG, (a) allocate available frequency spectrum to each transmission point and (b) apportion at least a portion of the allocated available frequency spectrum to each baseband unit of the SAG or each output of each baseband unit of the SAG; and
for each SAG, cause each apportioned at least a portion of the allocated available frequency spectrum, translated to baseband, to be transmitted to a corresponding baseband unit.

2. The program product of claim 1, wherein the RN comprises a distributed antenna system (DAS) or a system of at least one cellular radio, and wherein each network radio comprises a DAS radio if the RN is the DAS or a cellular radio if the RN comprises the system of at least cellular.

3. The program product of claim 1, wherein the program instructions are further configured, when executed by the at least one programmable processor, to cause the at least one programmable processor to cause, for each SAG, each apportioned at least a portion of the allocated available frequency spectrum to be transmitted to at least one of: a corresponding at least one network radio and a corresponding data distribution system.

4. The program product of claim 3, wherein each output is communicatively connected through a data distribution system to the one or more network radios.

5. The program product of claim 1, wherein the program instructions are further configured, when executed by the at least one programmable processor, to cause the at least one programmable processor to:
  determine if the maximum transmit power for at least one of the received one or more available frequency spectrum is less than a threshold power level; and
  if the maximum transmit power for at least one of the received one or more frequency spectrum is less than the threshold power level, then adjust the aggregate available frequency spectrum by excluding any frequency spectrum, whose maximum transmit power is less than the threshold power level, from the received one or more available frequency spectrum.

6. The program product of claim 1, wherein (a) allocating the available frequency spectrum to each transmission point and (b) apportioning the at least a portion of the allocated available frequency spectrum to each baseband unit of the SAG or each output of each baseband unit of the SAG comprises:
  determine if at least two network radios are communicatively connected to an output of any baseband unit of the RN; and
  if at least two network radios are communicatively connected to the output of any baseband unit of the RN, then:
    for each output of a baseband unit communicatively connected to at least two network radios, identify at least one connected set of network radios, wherein each connected set comprises at least one network radio communicatively connected to a same output of a baseband unit;
    for each connected set, determine a frequency spectrum for each network radio of a connected set by determining an aggregate available frequency spectrum of a transmission point, connected to a network radio, having a minimum bandwidth;
    allocate at least a portion of the determined frequency spectrum of each network radio to at least one operator pursuant to the operators' agreement; and
  if at least two network radios are not communicatively connected to the output of any baseband unit of the RN, then:
    identify each unique network radio, where each unique network radio is an only network communicatively connected an output of a baseband unit;
    determine a frequency spectrum for each unique network radio by determining an aggregate available frequency spectrum of a transmission point, connected to a unique network radio, having a minimum bandwidth; and
    allocate at least a portion of the determined frequency spectrum of each unique network radio to the at least one operator pursuant to the operators' agreement.

7. The program product of claim 1, wherein the at least one of: one or more available frequency spectrum and the corresponding maximum transmit power for each available frequency spectrum received for each transmission point of each SAG are provided by a spectrum access system (SAS) in response to a spectrum inquiry transmitted to the SAS or a grant request transmitted to the SAS.

8. The program product of claim 1, wherein the program instructions are further configured, when executed by at least one programmable processor, to cause the at least one programmable processor to:
  receive a grant request for at least one transmission point with a requested frequency spectrum;
  for each transmission point, determine if the requested frequency spectrum in the grant request is within the available frequency spectrum allocated to a corresponding transmission point;
  for each grant request comprising the requested frequency spectrum within the available frequency spectrum allocated to the corresponding transmission point, cause each such grant request to be transmitted to a spectrum access system (SAS);
  wherein receive the at least one of: one or more available frequency spectrum and the maximum transmit power level for each of the one or more available frequency spectrum comprises receive a maximum transmit power level in response to the grant request for the requested frequency spectrum or an alternative frequency spectrum and a corresponding maximum transmit power level;
  determine a set of output power levels output from each network radio, wherein each output power level of the set for each radio is a maximum transmit power level provided at an output of a corresponding network radio less any loss between the corresponding network radio and a unique transmission point connected to the corresponding network radio and an antenna gain of the unique transmission point;
  determine a minimum output power level of the set of output power levels for each network radio; and
  for each network radio, cause the minimum output power level to be transmitted to the corresponding network radio.

9. The program product of claim 1, wherein the program instructions are further configured, when executed by the at least one programmable processor, to cause the at least one programmable processor to:
  determine whether any network radio with an integrated antenna of the RN is registered with a spectrum access system (SAS); and
  if at least one network radio with an integrated antenna is registered with the SAS, then adjust a minimum output power level, of each network radio with an integrate antenna registered with the SAS, by adding a corresponding antenna gain, registered with the SAS, for a corresponding network radio with an integrated antenna.

10. The program product of claim 9, wherein the program instructions are further configured, when executed by at least one programmable processor, to cause the at least one programmable processor to transmit each adjusted minimum output power level to the SAS.

11. A method, comprising:
  for each transmission point of each spectrum allocation group (SAG) of a radio network (RN), receiving at least one of: one or more available frequency spectrum and a maximum transmit power level for each of the one or more available frequency spectrum, wherein aggregate available frequency spectrum is a sum of the one or more available frequency spectrum received for a transmission point, wherein a SAG comprises one or more baseband units communicatively connected through one output of each the one or more baseband units to one or more network radios, one or more transmission points each of which is electrically connected to one of the one or more network radios, and the one or more network radios, and wherein the radio network comprises the one or more baseband units, the one or more network radios, and the one or more transmission points;

for each SAG, based upon an operators' agreement and the aggregate available frequency spectrum of each transmission point of a SAG, (a) allocating available frequency spectrum to each transmission point and (b) apportioning at least a portion of the allocated available frequency spectrum to each baseband unit of the SAG or each output of each baseband unit of the SAG; and for each SAG, transmitting each apportioned at least a portion of the allocated available frequency spectrum, translated to baseband, to a corresponding baseband unit.

12. The method of claim 11, wherein the RN comprises a distributed antenna system (DAS) or a system of at least one cellular radio, and wherein each network radio comprises a DAS radio if the RN is the DAS or a cellular radio if the RN comprises the system of at least cellular.

13. The method of claim 11, further comprising transmitting, for each SAG, each apportioned at least a portion of the allocated available frequency spectrum to at least one of: a corresponding at least one network radio and a corresponding data distribution system.

14. The method of claim 13, wherein each output is communicatively connected through a data distribution system to the one or more network radios.

15. The method of claim 11, further comprising:
determining if the maximum transmit power for at least one of the received one or more available frequency spectrum is less than a threshold power level; and
if the maximum transmit power for at least one of the received one or more frequency spectrum is less than the threshold power level, then adjusting the aggregate available frequency spectrum by excluding any frequency spectrum, whose maximum transmit power is less than the threshold power level, from the received one or more available frequency spectrum.

16. The method of claim 11, wherein (a) allocating the available frequency spectrum to each transmission point and (b) apportioning the at least a portion of the allocated available frequency spectrum to each baseband unit of the SAG or each output of each baseband unit of the SAG comprises:
determining if at least two network radios are communicatively connected to an output of any baseband unit of the RN; and
if at least two network radios are communicatively connected to the output of any baseband unit of the RN, then:
for each output of a baseband unit communicatively connected to at least two network radios, identifying at least one connected set of network radios, wherein each connected set comprises at least one network radio communicatively connected to a same output of a baseband unit;
for each connected set, determining a frequency spectrum for each network radio of a connected set by determining an aggregate available frequency spectrum of a transmission point, connected to a network radio, having a minimum bandwidth;
allocating at least a portion of the determined frequency spectrum of each network radio to at least one operator pursuant to the operators' agreement; and
if at least two network radios are not communicatively connected to the output of any baseband unit of the RN, then:
identifying each unique network radio, where each unique network radio is an only network communicatively connected an output of a baseband unit;
determining a frequency spectrum for each unique network radio by determining an aggregate available frequency spectrum of a transmission point, connected to a unique network radio, having a minimum bandwidth; and
allocating at least a portion of the determined frequency spectrum of each unique network radio to the at least one operator pursuant to the operators' agreement.

17. The method of claim 11, wherein the at least one of: one or more available frequency spectrum and the corresponding maximum transmit power for each available frequency spectrum received for each transmission point of each SAG are provided by a spectrum access system (SAS) in response to a spectrum inquiry transmitted to a spectrum access system (SAS) a spectrum access system (SAS) or a grant request transmitted to the SAS.

18. The method of claim 11, further comprising:
receiving a grant request for at least one transmission point with a requested frequency spectrum;
for each transmission point, determining if the requested frequency spectrum in the grant request is within the available frequency spectrum allocated to a corresponding transmission point;
for each grant request comprising the requested frequency spectrum within the available frequency spectrum allocated to the corresponding transmission point, transmitting each such grant request to a spectrum access system (SAS);
wherein receiving the at least one of: one or more available frequency spectrum and the maximum transmit power level for each of the one or more available frequency spectrum comprises receiving a maximum transmit power level in response to the grant request for the requested frequency spectrum or an alternative frequency spectrum and a corresponding maximum transmit power level;
determining a set of output power levels output from each network radio, wherein each output power level of the set for each radio is a maximum transmit power level provided at an output of a corresponding network radio less any loss between the corresponding network radio and a unique transmission point connected to the corresponding network radio and an antenna gain of the unique transmission point;
determining a minimum output power level of the set of output power levels for each network radio; and
for each network radio, transmitting the minimum output power level to the corresponding network radio.

19. The method of claim 11, further comprising:
determining whether any network radio with an integrated antenna of the RN is registered with a spectrum access system (SAS); and
if at least one network radio with an integrated antenna is registered with the SAS, then adjusting a minimum output power level, of each network radio with an integrate antenna registered with the SAS, by adding a corresponding antenna gain, registered with the SAS, for a corresponding network radio with an integrated antenna.

20. The method of claim 19, further comprising transmitting each adjusted minimum output power level to the SAS.

21. An apparatus, comprising processing circuitry configured to:
for each transmission point of each spectrum allocation group (SAG) of a radio network (RN), receive at least one of: one or more available frequency spectrum and a maximum transmit power level for each of the one or more available frequency spectrum, wherein aggregate available frequency spectrum is a sum of the one or more available frequency spectrum received for a transmission point, wherein a SAG comprises one or more baseband units communicatively connected through one output of each the one or more baseband units to one or more network radios, one or more transmission points each of which is electrically connected to one of the one or more network radios, and the one or more network radios, and wherein the radio network comprises the one or more baseband units, the one or more network radios, and the one or more transmission points;

for each SAG, based upon an operators' agreement and the aggregate available frequency spectrum of each transmission point of a SAG, (a) allocate available frequency spectrum to each transmission point and (b) apportion at least a portion of the allocated available frequency spectrum to each baseband unit of the SAG or each output of each baseband unit of the SAG; and for each SAG, cause each apportioned at least a portion of the allocated available frequency spectrum, translated to baseband, to be transmitted to a corresponding baseband unit.

22. The apparatus of claim 21, wherein the RN comprises a distributed antenna system (DAS) or a system of at least one cellular radio, and wherein each network radio comprises a DAS radio if the RN is the DAS or a cellular radio if the RN comprises the system of at least cellular.

23. The apparatus of claim 21, wherein the processing circuitry is further configured to cause, for each SAG, each apportioned at least a portion of the allocated available frequency spectrum to be transmitted to at least one of: a corresponding at least one network radio and a corresponding data distribution system.

24. The apparatus of claim 23, wherein each output is communicatively connected through a data distribution system to the one or more network radios.

25. The apparatus of claim 21, wherein the processing circuitry is further configured to:
determine if the maximum transmit power for at least one of the received one or more available frequency spectrum is less than a threshold power level; and
if the maximum transmit power for at least one of the received one or more frequency spectrum is less than the threshold power level, then adjust the aggregate available frequency spectrum by excluding any frequency spectrum, whose maximum transmit power is less than the threshold power level, from the received one or more available frequency spectrum.

26. The apparatus of claim 21, wherein (a) allocate the available frequency spectrum to each transmission point and (b) apportion the at least a portion of the allocated available frequency spectrum to each baseband unit of the SAG or each output of each baseband unit of the SAG comprises:
determine if at least two network radios are communicatively connected to an output of any baseband unit of the RN; and
if at least two network radios are communicatively connected to the output of any baseband unit of the RN, then:
for each output of a baseband unit communicatively connected to at least two network radios, identify at least one connected set of network radios, wherein each connected set comprises at least one network radio communicatively connected to a same output of a baseband unit;
for each connected set, determine a frequency spectrum for each network radio of a connected set by determining an aggregate available frequency spectrum of a transmission point, connected to a network radio, having a minimum bandwidth;
allocate at least a portion of the determined frequency spectrum of each network radio to at least one operator pursuant to the operators' agreement; and
if at least two network radios are not communicatively connected to the output of any baseband unit of the RN, then:
identify each unique network radio, where each unique network radio is an only network communicatively connected an output of a baseband unit;
determine a frequency spectrum for each unique network radio by determining an aggregate available frequency spectrum of a transmission point, connected to a unique network radio, having a minimum bandwidth; and
allocate at least a portion of the determined frequency spectrum of each unique network radio to the at least one operator pursuant to the operators' agreement.

27. The apparatus of claim 21, wherein the at least one of: one or more available frequency spectrum and the corresponding maximum transmit power for each available frequency spectrum received for each transmission point of each SAG are provided by a spectrum access system (SAS) in response to a spectrum inquiry transmitted to a spectrum access system (SAS) or a grant request transmitted to the SAS.

28. The apparatus of claim 21, wherein the processing circuitry is further configured to:
receive a grant request for at least one transmission point with a requested frequency spectrum;
for each transmission point, determine if the requested frequency spectrum in the grant request is within the available frequency spectrum allocated to a corresponding transmission point;
for each grant request comprising the requested frequency spectrum within the available frequency spectrum allocated to the corresponding transmission point, cause each such grant request to be transmitted to a spectrum access system (SAS);
wherein receive the at least one of: one or more available frequency spectrum and the maximum transmit power level for each of the one or more available frequency spectrum comprises receive a maximum transmit power level in response to the grant request for the requested frequency spectrum or an alternative frequency spectrum and a corresponding maximum transmit power level;
determine a set of output power levels output from each network radio, wherein each output power level of the set for each radio is a maximum transmit power level provided at an output of a corresponding network radio less any loss between the corresponding network radio and a unique transmission point connected to the corresponding network radio and an antenna gain of the unique transmission point;
determine a minimum output power level of the set of output power levels for each network radio; and
for each network radio, cause the minimum output power level to be transmitted the corresponding network radio.

29. The apparatus of claim 21, wherein the processing circuitry is further configured to:

determine whether any network radio with an integrated antenna of the RN is registered with a spectrum access system (SAS); and if at least one network radio with an integrated antenna is registered with the SAS, then adjust a minimum output power level, of each network radio with an integrate antenna registered with the SAS, by adding a corresponding antenna gain, registered with the SAS, for a corresponding network radio with an integrated antenna.

30. The apparatus of claim 29, wherein the processing circuitry is further configured to cause transmission of each adjusted minimum output power level to the SAS.

* * * * *